US012786363B2

(12) United States Patent
Lim et al.

(10) Patent No.: US 12,786,363 B2
(45) Date of Patent: Nov. 3, 2026

(54) IMAGE PROJECTION APPARATUS, METHOD, AND STORAGE MEDIUM

(71) Applicant: SAMSUNG ELECTRONICS CO., LTD., Suwon-si (KR)

(72) Inventors: Hyungjun Lim, Suwon-si (KR); Hyunku Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/286,892

(22) Filed: Jul. 31, 2025

(65) Prior Publication Data

US 2026/0019542 A1 Jan. 15, 2026

Related U.S. Application Data

(63) Continuation of application No. PCT/KR2025/009902, filed on Jul. 8, 2025.

(30) Foreign Application Priority Data

Jul. 9, 2024 (KR) ........................ 10-2024-0090631
Nov. 13, 2024 (KR) ........................ 10-2024-0161080

(51) Int. Cl.
*H04N 9/31* (2006.01)

(52) U.S. Cl.
CPC ................................ *H04N 9/3179* (2013.01)

(58) Field of Classification Search
CPC ... H04N 9/3179; H04N 9/3185; H04N 9/3194
See application file for complete search history.

(56) References Cited

U.S. PATENT DOCUMENTS 3,541,541 A * 11/1970 Engelbart ........... G06F 3/03543
340/870.07
5,861,881 A * 1/1999 Freeman ................ H04H 20/30
348/E7.071

(Continued)

FOREIGN PATENT DOCUMENTS

CN 117726943 A 3/2024
JP 2011-70579 A 4/2011

(Continued)

OTHER PUBLICATIONS

International Search Report and Written Opinion (PCT/ISA/210 and PCT/ISA/237) dated Oct. 15, 2025, issued by International Searching Authority for International Application No. PCT/KR2025/009902.

*Primary Examiner* — Michael B. Pierorazio
(74) *Attorney, Agent, or Firm* — Sughrue Mion, PLLC

(57) ABSTRACT

A method for operating an image projection apparatus, includes: detecting, by at least one sensor of the image projection apparatus, first position data in a coordinate space corresponding to a plurality of sensing measurement points on a projection plane where an optical signal corresponding to an output image is projected; determining second position data in a coordinate plane reflecting a curvature characteristic of the projection plane, based on the first position data; and obtaining third position data corresponding to a plurality of pixel projection points, wherein the optical signal is projected onto the plurality of pixel projection points of a projection region of the projection plane by performing area-weighted interpolation of the second position data.

20 Claims, 20 Drawing Sheets

(56) References Cited

U.S. PATENT DOCUMENTS

| | | | | |
|---|---|---|---|---|
| 7,526,362 | B2 * | 4/2009 | Kim | G05D 1/0016 701/28 |
| 7,712,125 | B2 * | 5/2010 | Herigstad | H04N 21/4755 725/38 |
| 8,355,601 | B2 | 1/2013 | Ding et al. | |
| 8,830,067 | B2 * | 9/2014 | Igaki | G06F 3/017 340/693.11 |
| 8,893,164 | B1 * | 11/2014 | Teller | G06Q 30/0252 725/12 |
| 8,941,785 | B2 | 1/2015 | Saigo | |
| 9,167,218 | B2 | 10/2015 | Saigo | |
| 10,616,541 | B2 * | 4/2020 | Oike | H04N 9/3182 |
| 11,134,230 | B2 * | 9/2021 | Naganuma | G09G 5/10 |
| 2002/0085843 | A1 * | 7/2002 | Mann | E03C 1/057 396/374 |
| 2006/0064733 | A1 * | 3/2006 | Norton | H04N 21/42646 725/135 |
| 2006/0256133 | A1 * | 11/2006 | Rosenberg | G06F 3/013 345/619 |
| 2007/0124775 | A1 * | 5/2007 | DaCosta | H04N 21/6582 348/E7.071 |
| 2009/0067847 | A1 * | 3/2009 | Nakamura | G08C 23/04 398/128 |
| 2010/0020752 | A1 * | 1/2010 | Anschutz | H04W 4/023 370/328 |
| 2010/0088735 | A1 * | 4/2010 | Sadja | H04N 21/4722 725/116 |
| 2010/0192173 | A1 * | 7/2010 | Mizuki | H04N 21/4312 725/115 |
| 2011/0072448 | A1 * | 3/2011 | Stiers | H04N 21/44204 725/10 |
| 2011/0239266 | A1 * | 9/2011 | Brooks | H04B 10/85 398/141 |
| 2012/0075168 | A1 * | 3/2012 | Osterhout | G06F 3/017 345/8 |
| 2012/0093481 | A1 * | 4/2012 | McDowell | G11B 27/322 348/143 |
| 2012/0222057 | A1 * | 8/2012 | Sadowsky | H04N 21/4223 725/10 |
| 2012/0222058 | A1 * | 8/2012 | el Kaliouby | H04N 21/251 725/10 |
| 2012/0324491 | A1 * | 12/2012 | Bathiche | H04N 21/42201 725/10 |
| 2012/0324492 | A1 * | 12/2012 | Treadwell, III | H04H 60/45 725/10 |
| 2012/0324493 | A1 * | 12/2012 | Holmdahl | H04N 21/252 725/86 |
| 2012/0324494 | A1 * | 12/2012 | Burger | H04N 21/25891 725/12 |
| 2013/0097643 | A1 * | 4/2013 | Stone | A63F 13/44 725/61 |
| 2015/0052555 | A1 * | 2/2015 | Lian | G06F 3/04842 725/37 |
| 2020/0225567 | A1 | 7/2020 | Kano | |
| 2020/0404232 | A1 | 12/2020 | Choi et al. | |
| 2022/0030206 | A1 | 1/2022 | Ikeda et al. | |
| 2022/0141435 | A1 | 5/2022 | Zhang et al. | |
| 2022/0196836 | A1 | 6/2022 | Zhong et al. | |
| 2022/0276770 | A1 | 9/2022 | Davis et al. | |
| 2022/0368872 | A1 * | 11/2022 | Shishido | H04N 9/3194 |
| 2024/0129423 | A1 * | 4/2024 | Nishimori | H04N 9/3194 |
| 2024/0195946 | A1 | 6/2024 | Chae et al. | |
| 2024/0333896 | A1 * | 10/2024 | Tsuji | G06T 7/73 |

FOREIGN PATENT DOCUMENTS

| | | | |
|---|---|---|---|
| JP | 2011-147125 | A | 7/2011 |
| JP | 2014-192688 | A | 10/2014 |
| JP | 2016-157174 | A | 9/2016 |
| JP | 2022-146113 | A | 10/2022 |
| KR | 10-2154684 | B1 | 9/2020 |
| KR | 10-2020-0145642 | A | 12/2020 |
| KR | 10-2231023 | B1 | 3/2021 |
| KR | 10-2023-0055018 | A | 4/2023 |
| KR | 10-2025-0089700 | A | 6/2025 |
| WO | 2014/177750 | A1 | 11/2014 |

* cited by examiner

IMAGE PROJECTION APPARATUS, METHOD, AND STORAGE MEDIUM

CROSS-REFERENCE TO RELATED APPLICATIONS

This application is a by-pass continuation application of International Application No. PCT/KR2025/009902, filed on Jul. 8, 2025, which is based on and claims priority to Korean Patent Application Nos. 10-2024-0090631, filed on Jul. 9, 2024, and 10-2024-0161080, filed on Nov. 13, 2024, in the Korean Intellectual Property Office, the disclosures of which are incorporated by reference herein their entireties.

BACKGROUND

1. Field

The disclosure relates to an image projection apparatus, method, and storage medium for displaying an image on a projection plane.

2. Description of Related Art

Projection devices may be analog-type projection devices ("analog projection devices") or digital-type projection devices ("digital projection devices"). The analog projection device may provide visual information using a medium, such as a film. The digital projection device may provide visual information using digital signals. The digital projection device may include a beam projector (hereinafter referred to as "projector"). The projector may be classified as a display device. The projector may be implemented as a cathode ray tube (CRT) projector, a liquid crystal display (LCD) projector, or a digital light processing (DLP) projector depending on how light is generated.

The projector is used mainly to display multimedia content that is directly input to the projector. When the projector is connected to an electronic device (e.g., a digital television), through a wired or wireless communication network, the projector can display the multimedia content received from the electronic device.

The projector may be an electronic device that may project photos, pictures, texts, images, or video on the screen through a lens. The projector may be also called an image projection apparatus. The projector may convert data about an image or video in the form of a file into an optical signal (or light image) and output it. The output of the optical signal may correspond to an irradiation. The optical signal output by the projector may be projected on the screen to provide an image to the viewer.

The projector can display (project) an image on a non-planar projection plane, as well as a planar surface, to expand the projection region of the projector. In this case, distortion may occur in the image to be projected onto the non-planar projection plane. The above-described information may be provided as related art for the purpose of helping understanding of the disclosure. The foregoing cannot be claimed as, or used to determine, the related art related to the disclosure.

SUMMARY

According to an aspect of the disclosure, an image projection apparatus includes: at least one sensor; at least one memory comprising a non-volatile storage medium storing instructions; an image projector configured to project an optical signal corresponding to an output image onto a projection plane; and at least one processor operatively connected with the at least one sensor, the at least one memory, and the image projector and including a processing circuit, wherein the instructions, when executed by the at least one processor individually or collectively, cause the image projection apparatus to: detect, using the at least one sensor, first position data in a coordinate space corresponding to a plurality of sensing measurement points on the projection plane; determine second position data in a coordinate plane reflecting a curvature characteristic of the projection plane, based on the first position data; and obtain third position data corresponding to a plurality of pixel projection points, wherein the optical signal is projected onto the plurality of pixel projection points of a projection region of the projection plane by performing area-weighted interpolation of the second position data.

According to an aspect of the disclosure, a method for operating an image projection apparatus, includes: detecting, by at least one sensor of the image projection apparatus, first position data in a coordinate space corresponding to a plurality of sensing measurement points on a projection plane where an optical signal corresponding to an output image is projected; determining second position data in a coordinate plane reflecting a curvature characteristic of the projection plane, based on the first position data; and obtaining third position data corresponding to a plurality of pixel projection points, wherein the optical signal is projected onto the plurality of pixel projection points of a projection region of the projection plane by performing area-weighted interpolation of the second position data.

According to an aspect of the disclosure, a non-transitory storage medium storing at least one computer-readable instruction, wherein when executed by at least a portion of at least one processor in an image projection apparatus, the instructions cause the image projection apparatus to perform: detecting, by at least one sensor of the image projection sensor, first position data in a coordinate space corresponding to a plurality of sensing measurement points on a projection plane where an optical signal corresponding to an output image is projected; determining second position data in a coordinate plane reflecting a curvature characteristic of the projection plane, based on the first position data; and obtaining third position data corresponding to a plurality of pixel projection points, wherein the optical signal is projected onto the plurality of pixel projection points of a projection region of the projection plane by performing area-weighted interpolation of the second position data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
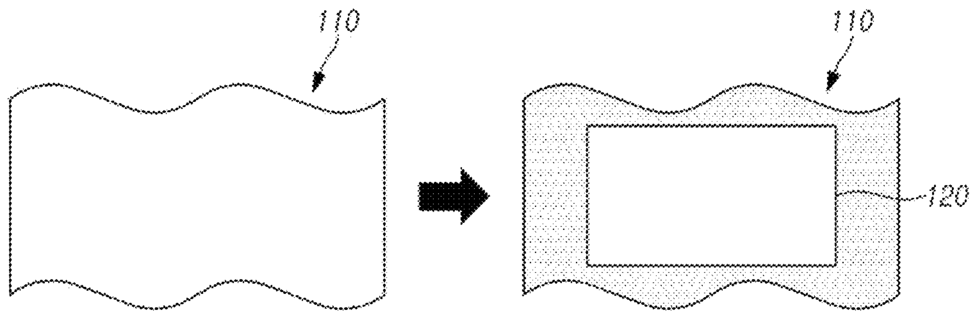
FIG. 1 is a view illustrating an example of projecting an image onto a curved projection plane in an image projection system according to an embodiment.

Hereinafter, embodiments of the disclosure are described in detail with reference to the drawings so that those skilled in the art to which the disclosure pertains may easily practice the disclosure. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

Figure 2:
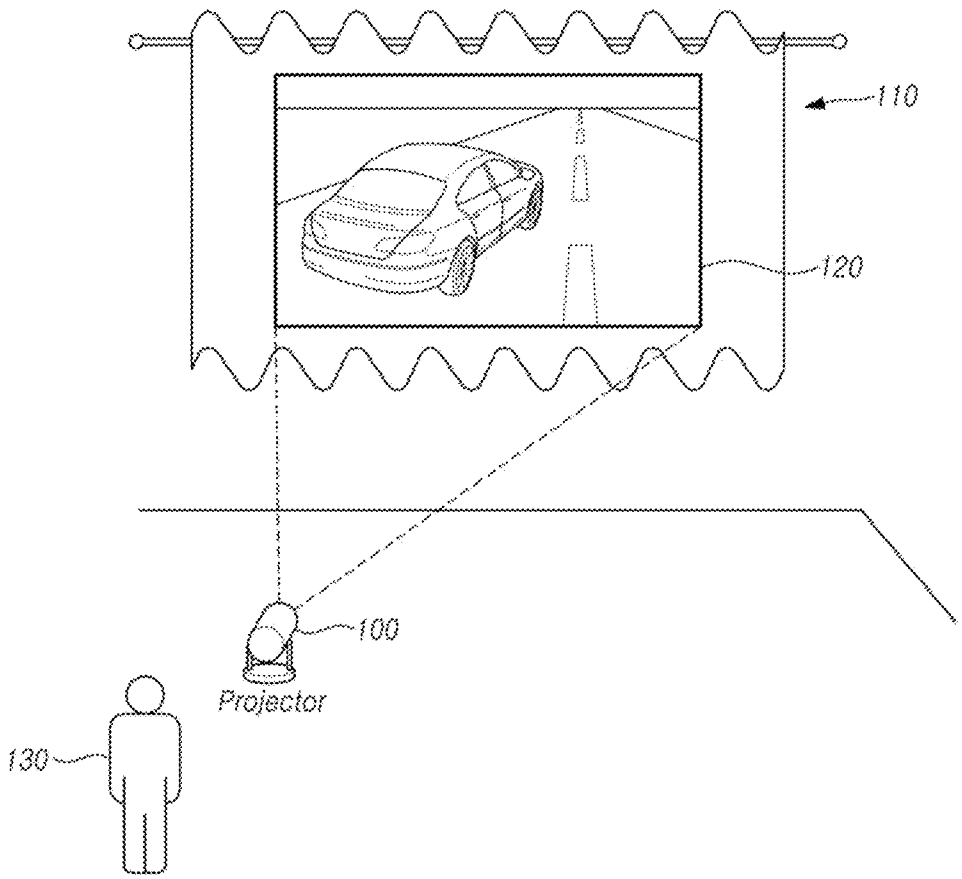
FIG. 2 is a view illustrating an operation of projecting an image onto a curved projection plane in an image projection system according to an embodiment.

FIG. 1 is a view illustrating an example of projecting an image on a curved projection plane in an image projection system according to an embodiment, and FIG. 2 is a view illustrating an operation of projecting an image on a curved projection plane in an image projection system according to an embodiment.

Referring to FIG. 1 or FIG. 2, an image projection system may include an image projection apparatus 100 (e.g., a beam projector) or a projection plane 110. The image projection apparatus 100 may convert input image data (hereinafter referred to as an 'input image') into an optical signal (hereinafter referred to as an 'output image') and output the same optical signal. The output image output by the image projection apparatus 100 may be projected onto the projection plane 110 that may include a projection region 120 where an image according to a content service such as a movie or a game is projected. The projection region 120 may include an image display region in which an image projected by the output image is substantially displayed. The projection plane 110 where the output image is projected by the image projection apparatus 100 may be a flat surface or a non-plane. When the projection plane 110 is planar like a screen, the image projection apparatus 100 may convert the input image into an output image that is an optical signal without any special correction and output it. When the projection plane 110 is non-planar, such as a curved surface, the image projection apparatus 100 may perform signal processing for automatically correcting (e.g., auto keystone) the input image so that the image displayed on the non-planar projection plane 110 may look like a planar image without distortion, and project the output image. Hereinafter, the projection plane 110 having a predetermined curvature characteristic, rather than the plane, is referred to as a 'curved projection plane 110', for example, a curved surface such as a curtain, tent, or banner. Further, in the disclosure, a projection plane not specified as a 'planar projection plane' may be used to refer to the curved projection plane 110.

In an embodiment, the image projection apparatus 100 may process image data to be output as an optical signal considering the curvature characteristic of the projection plane 110. The curvature characteristic of the projection plane 110 may be related to the shape in which the projection plane 110 is bent or curved. The curvature characteristic of the projection plane 110 may include, e.g., the characteristic of a wave formed by crests and roots in a predetermined direction, such as horizontal (or left and right), vertical (or up and down), or diagonal direction.

Figure 3:
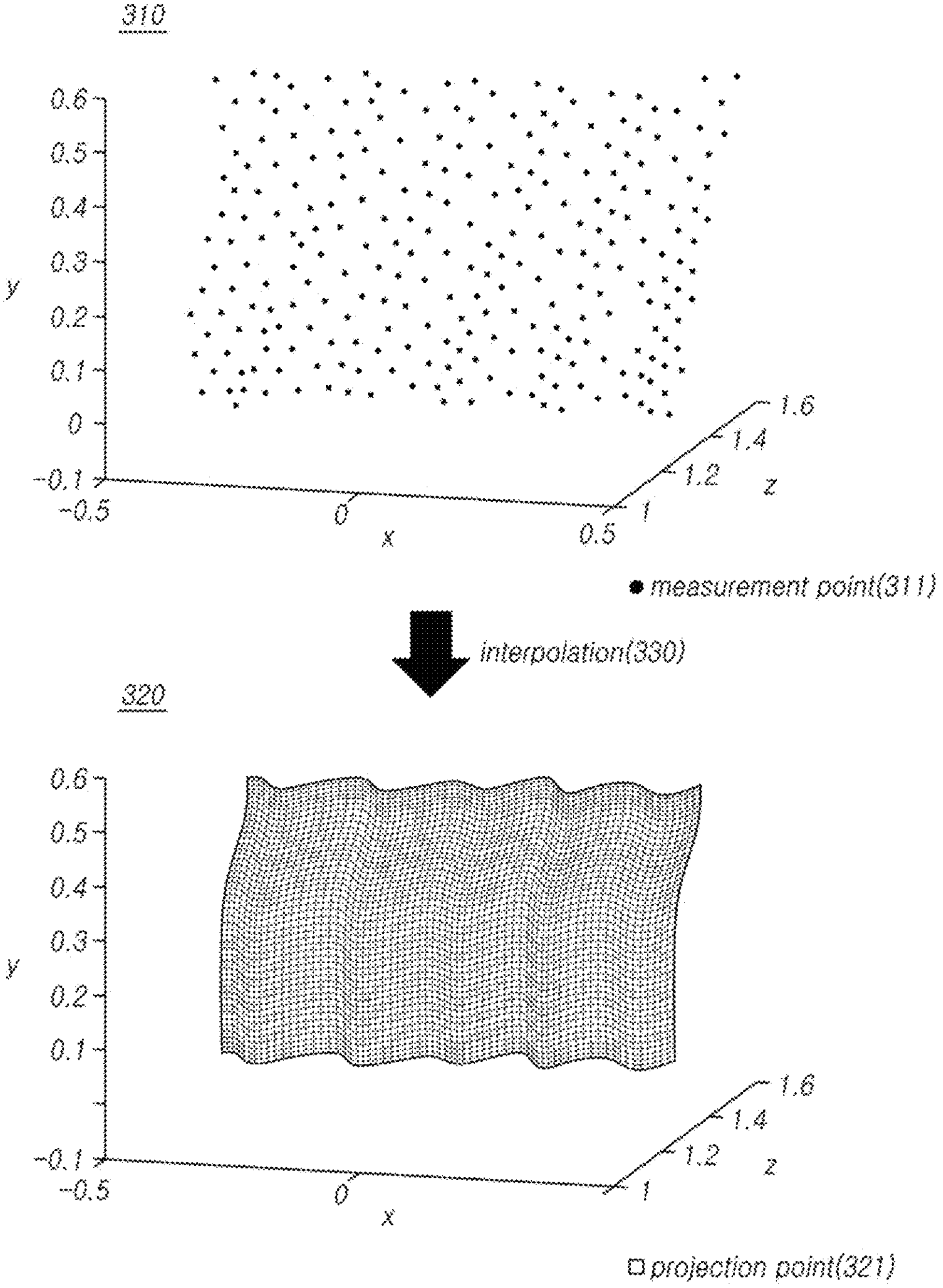
FIG. 3 is a view illustrating obtaining projection points based on measurement points in an image projection apparatus according to an embodiment.

FIG. 3 is a view illustrating obtaining projection points based on measurement points in an image projection apparatus (e.g., the image projection apparatus 100 of FIG. 2) according to an embodiment.

Referring to FIG. 3, the image projection apparatus 100 may obtain position data (hereinafter referred to as 'first position data') corresponding to a plurality of measurement points 311 (hereinafter referred to as 'sensing measurement points' 311) included in the curved projection plane (e.g., the projection plane 110 of FIG. 1) using a distance sensor (e.g., a distance sensor 420 of FIG. 4) such as a time of flight (ToF) sensor. For example, the first position data may include a space orthogonal coordinate (or three-dimensional (3D) Cartesian coordinate system) (hereinafter referred to as a 'space orthogonal coordinate system') corresponding to each position of the sensing measurement points 311 in the coordinate space. The space orthogonal coordinate system corresponding to the position of each of the sensing measurement points 311 may be referred to as a 'first coordinate value'.

For example, the projection plane 110 may include about 250 sensing measurement points 311. In this case, the first position data may include about 250 first coordinate values. The first graph 310 illustrates first coordinate values obtained corresponding to the sensing measurement points 311. According to the first graph 310, the sensing measurement points 311 may be irregularly distributed due to the curvature characteristic of the projection plane 110. For example, the separation distance between measurement points distributed near the crest and/or root on the projection plane 110 may be relatively narrow compared to the separation distance between measurement points (distributed) on the inclined surface. In consideration of the characteristic, the first position data obtained by the image projection apparatus 100 for the sensing measurement points 311 may be unstructured scattered data. Here, "structured" means that a specific structure or an order is set between relative positions.

The image projection apparatus 100 may perform data interpolation 330 for obtaining position data corresponding to a plurality of projection points 321 (hereinafter, referred to as 'pixel projection points') based on the first position data corresponding to a small number of sensing measurement points 311. According to an example, the position data corresponding to the pixel projection points 321 may correspond to the pixel projection points 321 where the pixels of the output image 403 are to be projected in the projection region (e.g., the projection region 120 of FIG. 1 or 2) by performing the data interpolation 330 using the first position data by the image projection apparatus 100. The second graph 320 illustrates second coordinate values obtained corresponding to the pixel projection points 321.

According to an example, the image projection apparatus 100 may perform a pre-processing process on the first position data before performing the data interpolation 330. For example, the image projection apparatus 100 may determine the second position data on the coordinate plane reflecting the curvature characteristic of the projection plane 110 based on the first position data. The image projection apparatus 100 may perform data interpolation using the second position data to obtain third position data corresponding to the pixel projection points 321 where the optical signal is projected in the projection region 120 of the projection plane 110. The third position data may include a space orthogonal coordinate system corresponding to the position of each of the pixel projection points 321 in the coordinate space. A detailed operation according to the pre-processing process by the image projection apparatus 100 is described below.

Figure 4:
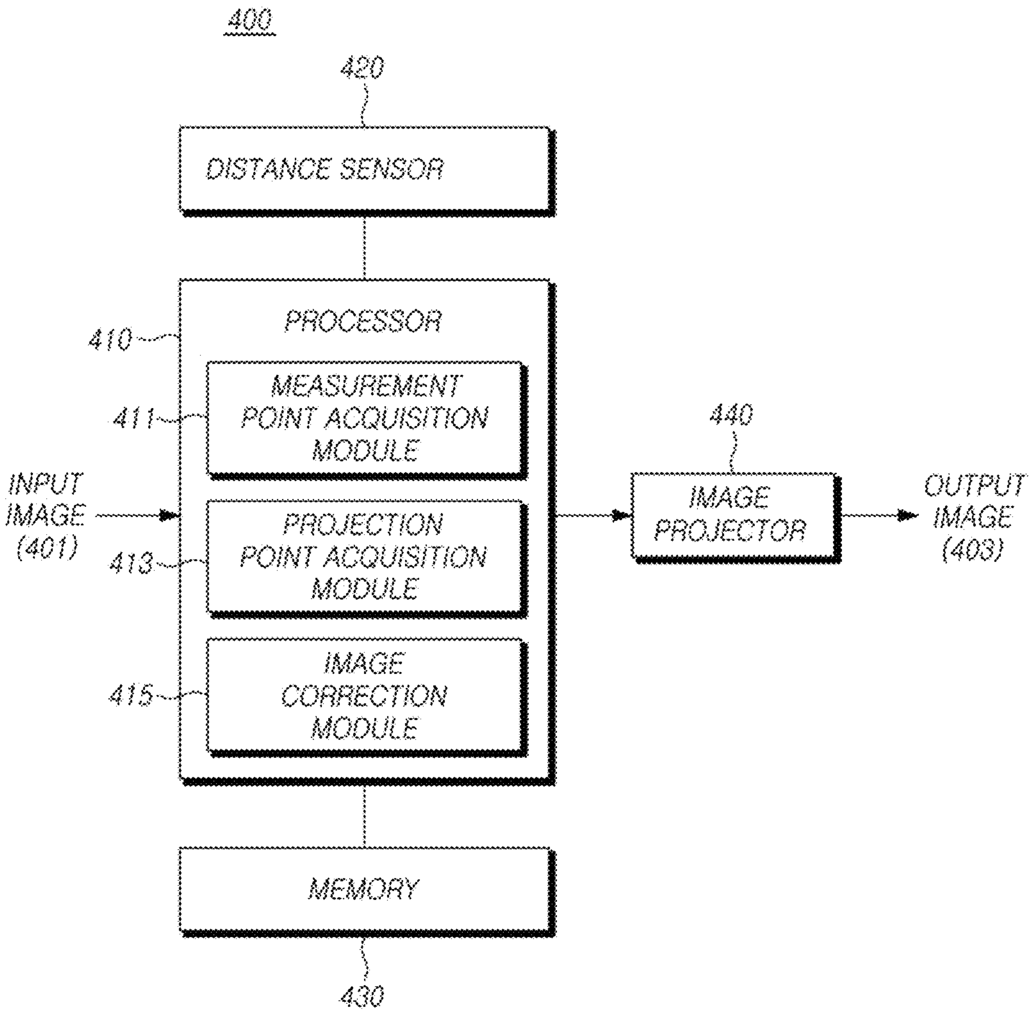
FIG. 4 is a block view illustrating a configuration for projecting image data in an image projection apparatus according to an embodiment.

FIG. 4 is a block view 400 illustrating a configuration for projecting image data in an image projection apparatus (e.g., the image projection apparatus 100 of FIG. 2) according to an embodiment.

Referring to FIG. 4, the image projection apparatus 100 may include at least one processor 410 (hereinafter, referred to as the processor 410), at least one sensor, at least one memory 430 (hereinafter, referred to as memory 430), or an image projector 440. At least one sensor may include a distance sensor 420. The distance sensor 420 may be a ToF sensor or a ToF camera.

The distance sensor 420 may obtain position data (hereinafter, referred to as 'first position data' or 'first coordinate value') corresponding to a plurality of measurement points (e.g., the sensing measurement point 311 of FIG. 3) included in the projection plane (e.g., the projection plane 110 of FIG. 1 or FIG. 2). The sensing measurement points 311 may be distributed on the projection plane 110. According to an example, when the projection plane 110 is a curved surface, the sensing measurement points 311 may not be uniformly distributed on the projection plane 110 but may be irregularly dispersed and disposed. For example, assuming a distance sensor 420 that transmits beams so that the measurement points are evenly distributed on the planar projection plane, the beams transmitted by the distance sensor 420 may provide a distribution of measurement points that narrow the gap in proportion to the inclination (or slope) of the curved projection plane 110. In other words, the measurement points present in a highly inclined area (hereinafter, a 'first inclined surface') in the curved projection plane 110 may be distributed and disposed at relatively wider intervals compared to the measurement points present in a relatively less inclined area (hereinafter, a 'second inclined surface'). Therefore, the density of the measurement points on the first inclined surface may be relatively lower than the density of the measurement points on the second inclined surface. For example, the first inclined surface may be distinguished based on the difference in the degree of relative local gradient from the second inclined surface due to the curvature of the projection plane 110, which may be an exemplary assumption. For an example in which the sensing measurement points 331 are distributed and disposed on the projection plane 110, FIG. 3 may be referred to.

The memory 430 may store various data used by at least one component (e.g., the processor 410 or the distance sensor 420) of the image projection apparatus 100. The data may include, e.g., software (e.g., program), and input data or output data for software related commands. The memory 430 may include volatile memory or nonvolatile memory. The program may be stored as software, e.g., in the memory 430. According to an example, the memory 430 may include an operating system, middleware, or an application.

The image projector 440 may be configured to output an output image 403 to be projected onto a projection region 120 of a projection plane 110, as an optical signal, for screen output. For example, the image projector 440 may convert an electrical signal provided from the processor 410 into an output image 403 to be projected, which is an optical signal, and output the same toward the projection region 120. The electrical signal provided by the processor 410 may correspond to image data such as a photo or a video.

The processor 410 may execute software to control at least one other component (e.g., a hardware or software component) such as the distance sensor 420 or the image projector 440, which is electrically connected thereto, or may process or compute various data. As at least part of the data processing or computation, the processor 410 may store instructions or data received from other components (e.g., the distance sensor 420, the sensor unit 1230, a user interface (I/F), or a transceiver) in the memory 430 (e.g., volatile memory), or process the instructions or data stored in the memory 430, and store the processed resulting data in the memory 430.

The processor 410 may be implemented as one or more integrated circuit (IC) chips and may perform various data processing. For example, the processor 410 (or an application processor (AP)) may be implemented as a system on chip (SoC) (e.g., one chip or chipset). The processor 410 may include sub components including a central processing unit (CPU), a graphics processing unit (GPU), a neural processing unit (NPU), an image signal processor (ISP), a display controller, a memory controller, a storage controller, a communication processor (CP), and/or a sensor interface. The sub components are merely exemplary. For example, processor 410 may further include other sub components. For example, some sub components may be omitted from the processor 410. For example, some sub components may be included as separate components of the image projection apparatus 100 outside the processor 410. For example, some sub components may be included in other components (e.g., a display and an image sensor).

The processor 410 (e.g., a CPU or a central processing circuit) may be configured to control sub components based on execution of instructions stored in the memory 430 (e.g., a volatile memory and/or a non-volatile memory). According to an example, the GPU (or the graphics processing circuit) included in the processor 410 may be configured to execute parallel computations (e.g., rendering). According to an example, the NPU (or neural processing circuit) included in the processor 410 may be configured to execute operations (e.g., convolution computations) for an artificial intelligence model. According to an example, the ISP (or the image signal processing circuit) included in the processor

410 may be configured to process a raw image obtained through the image sensor into a format suitable for a component in the image projection apparatus 100 or a sub component in the processor 410. According to an example, the display controller (or display control circuit) included in the processor 410 may be configured to process the image 401 obtained from the CPU, GPU, ISP, or memory 430 (e.g., volatile memory) in a suitable format to be projected onto the projection plane (e.g., the projection plane 110 of FIG. 1 or FIG. 2).

According to an example, the memory controller (or memory control circuit) included in the processor 410 may be configured to control reading data from volatile memory and writing data to volatile memory. According to an example, the storage controller (or storage control circuit) included in the processor 410 may be configured to control reading data from nonvolatile memory and writing data to nonvolatile memory.

According to an example, the CP (communication processing circuit) included in the processor 410 may be configured to process data obtained from a sub component in the processor 410 into a format suitable for transmitting the data to another electronic device through the transceiver, or to process data obtained from another electronic device (e.g., a remote controller) through the transceiver into a format suitable for processing by the sub component. According to an example, the sensor interface (or sensing data processing circuit or sensor hub) included in the processor 410 may be configured to process data about the state of the image projection apparatus 100 and/or the state around the image projection apparatus 100, obtained through an internal sensor (e.g., a distance sensor (time-of-flight (ToF) sensor)) 420 or an external sensor (e.g., one or more position measurement sensors (anchors)), into a format suitable for a sub component in the processor 410.

According to an example, the processor 410 may process image data to be output as an optical signal considering the curvature characteristic of the projection plane 110 (or the projection region 120) by at least one sensor 420. The curvature characteristic of the projection plane 110 may be related to the shape in which the projection plane 110 is bent or curved. The curvature characteristic of the projection plane 110 may be the same as described above with reference to FIG. 3. The processor 410 may perform an operation of automatically correcting (auto keystone) the input image 401 so that the image displayed on the non-planar projection plane 110 may look like a planar image without distortion if the projection plane 110 is non-planar (e.g., the curved surface illustrated in FIG. 2).

Specifically, the processor 410 may detect first position data (or first coordinate value P1(x, y, z)) in the coordinate space corresponding to a plurality of sensing measurement points 311 distributed on the projection plane 110 by at least one sensor 420.

The processor 410 may determine the second position data in the coordinate plane reflecting the curvature characteristic of the projection plane 110 based on the detected first position data. For example, the curvature characteristic of the projection plane 110 may include information about the directionality of the wave propagating in a single direction on the projection plane 110. According to an example, the processor 410 may obtain the local gradient (gx, gy) of the sensing measurement points 331 on a first coordinate plane (e.g., the coordinate plane 610 of FIG. 6A) by a predetermined coordinate axis (x, y) based on the first position data (see FIG. 6A). The processor 410 may determine the coordinate axis (e.g., v 625, u 627 of FIG. 6B) of the second coordinate plane to determine the second position data by reflecting the distribution of the obtained local gradient (see FIG. 6B). For example, the processor 410 may identify the distribution of the obtained local gradient for the sensing measurement points 331 on the coordinate plane (e.g., the coordinate plane 620 of FIG. 6B) using the local gradient (gx, gy) of the sensing measurement points 331 as a coordinate axis (e.g., gy 621, gx 623 of FIG. 6B). For example, the distribution of the local gradient in the coordinate plane (e.g., the coordinate plane 620 of FIG. 6B) using the local gradient (gx, gy) as the coordinate axis (e.g., gy 621, gx 623 of FIG. 6B) may have a distribution inclined from the upper left to the lower right (see FIG. 6B).

According to an example, the distribution of the local gradient may be affected by the curvature characteristic of the projection plane 110, i.e., the direction (or local gradient) in which the wave propagates on the projection plane 110. The processor 410 may determine an eigen vector related to the direction and an eigen value related to the inclination based on the distribution of the obtained local gradient. The processor 410 may obtain the coordinate axis (u, v) of the second coordinate plane based on the eigen vector and the eigen value. The image projection apparatus 100 may determine the size of the coordinate axis (u, v) on the second coordinate plane by, e.g., the ratio of the eigen value. The processor 410 may determine, as the second position data, a coordinate value (u value, v value), which is a planar orthogonal coordinate system corresponding to the first coordinate value P1(x, y, z), which is the first position data on the second coordinate plane.

The processor 410 may perform area-weighted interpolation using the determined second position data to obtain third position data corresponding to a plurality of pixel projection points 321 where the optical signal 403 is projected onto the projection region 120 of the projection plane 110. According to an example, the processor 410 may identify the planar orthogonal coordinate system (u, v) of the sensing measurement points 311 on the second coordinate plane based on the second position data. The processor 410 may determine the distance between the sensing measurement points 311 on the second coordinate plane using the identified planar orthogonal coordinate system (u, v). The processor 410 may perform 'Voronoi tessellation' based on the distance between the determined sensing measurement points (e.g., the pixel projection point (sensing measurement point) 611 of FIG. 6C). The processor 410 may obtain second cells corresponding to pixel projection points (e.g., the pixel projection point 643 of FIG. 6D) by performing scattered data interpolation on the first cells (e.g., the cell 631 of FIG. 6C) obtained as a result of Voronoi tessellation (e.g., the cell 630 of FIG. 6C). For example, the shape of the first cells and/or the second cells may narrow in a direction in which the inclination is present on the projection plane 110 according to the curvature characteristic (see FIG. 8B, FIG. 8C, FIG. 8D, or FIG. 8E).

Figure 6A:
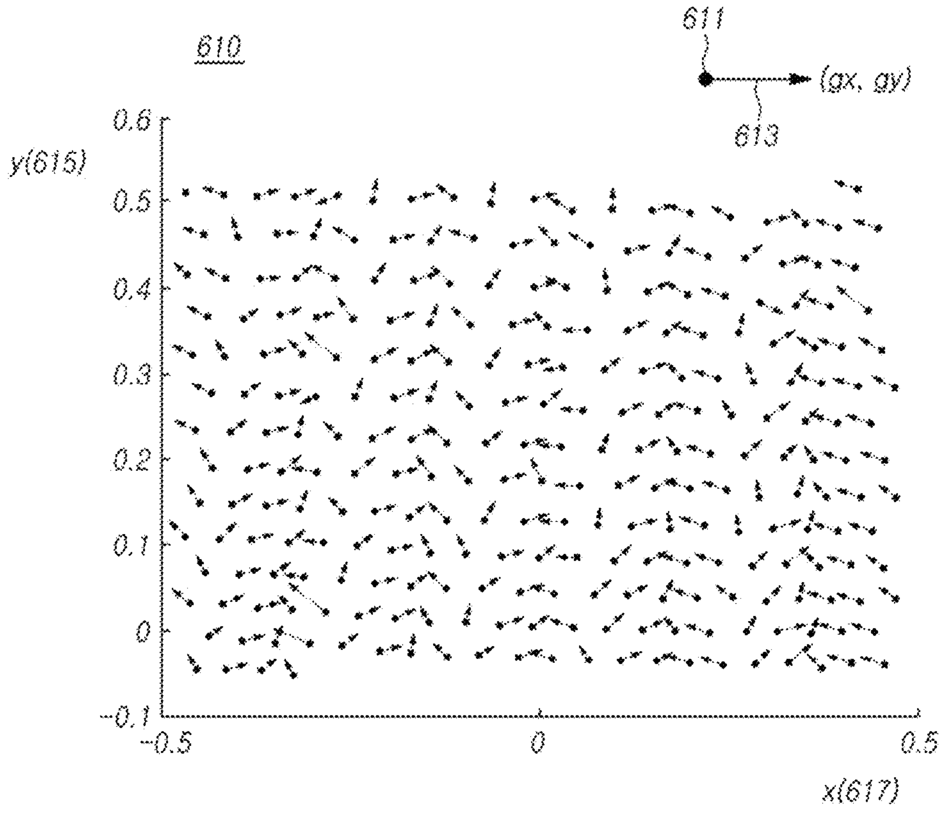
FIG. 6A is a view illustrating a local gradient distribution of sensing measurement points on a first coordinate plane.
Figure 6B:
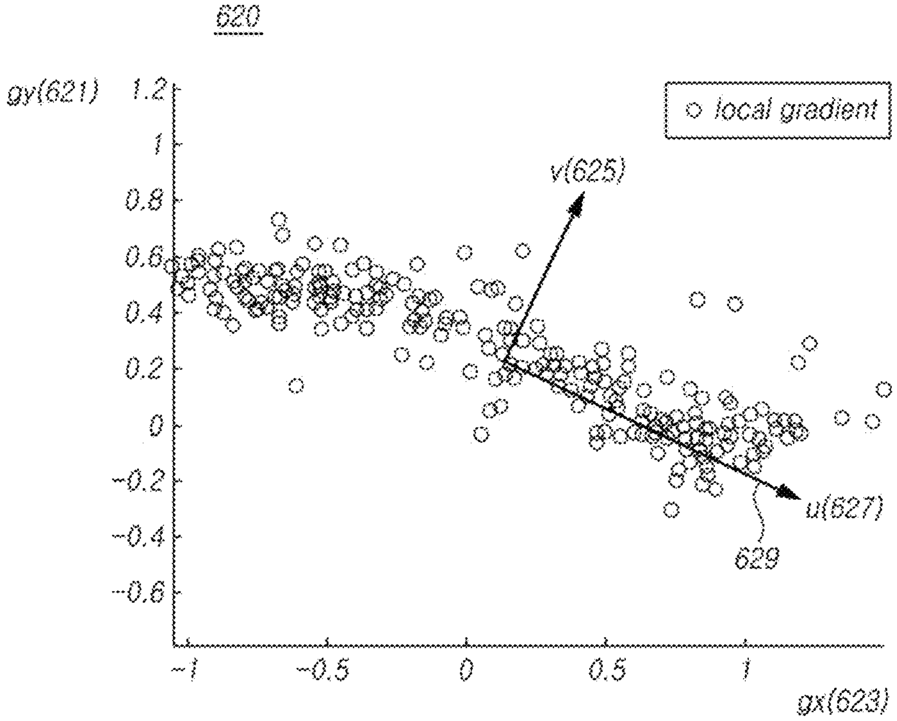
FIG. 6B is a view illustrating obtaining a new coordinate axis (u, v) based on a local gradient distribution on a second coordinate plane.
Figure 6C:
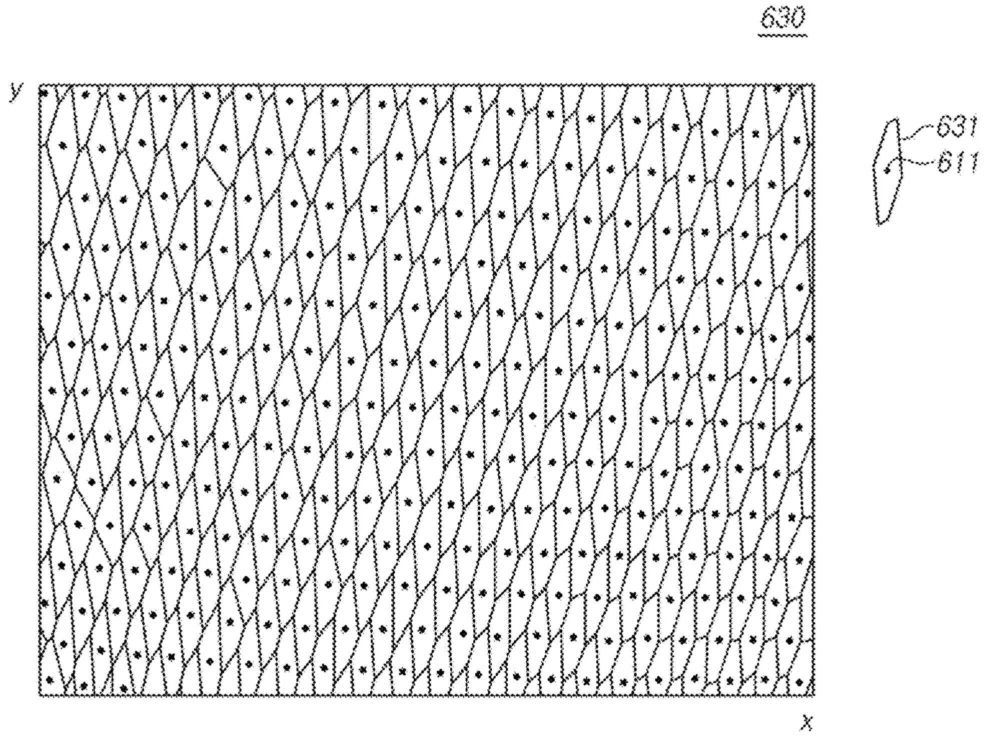
FIG. 6C is a view illustrating a result of Voronoi tessellation.
Figure 6D:
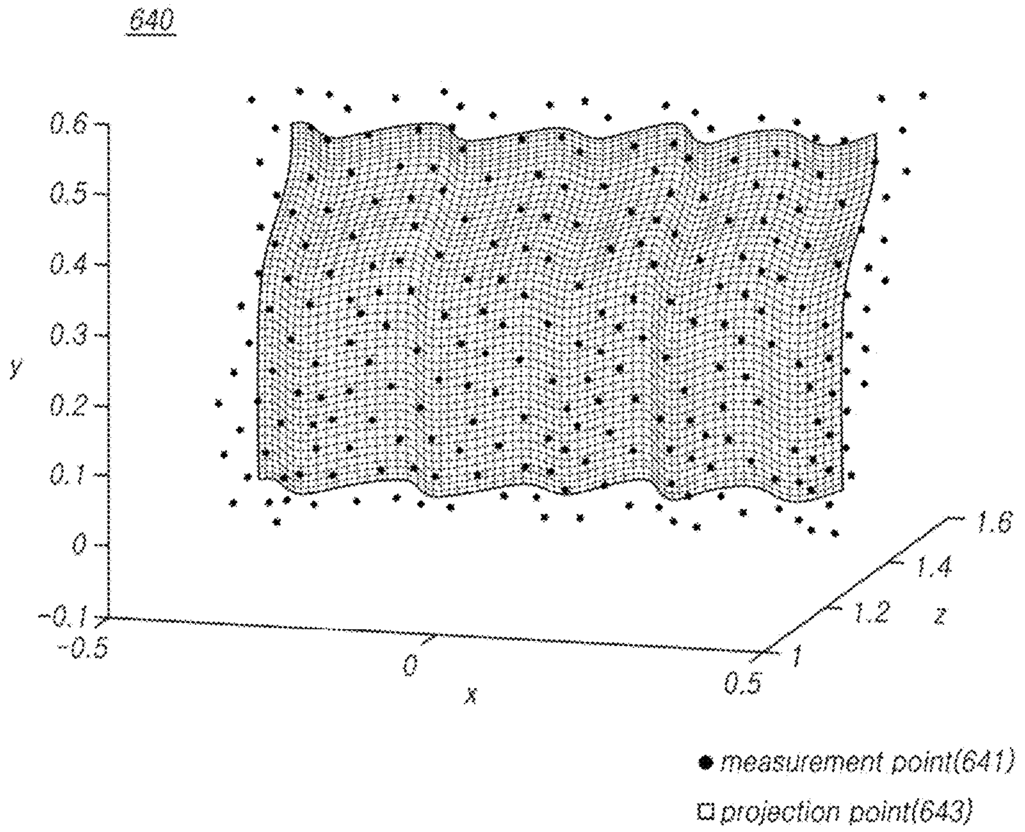
FIG. 6D is a view illustrating obtaining pixel projection points by performing data interpolation.

According to an example, the processor 410 may perform data interpolation (e.g., the interpolation 330 of FIG. 3) to obtain second position data corresponding to the plurality of pixel projection points (e.g., projection point 321 of FIG. 3 or 643 of FIG. 6D) from first position data corresponding to a small number of sensing measurement points (e.g., measurement point 311 of FIG. 3 or measurement point 641 of FIG. 6D). The first position data may be obtained by the distance sensor 420 for the sensing measurement points 311 and 641 included in the curved projection plane 110. The plurality of second position data may be obtained by the processor 410 for pixel projection points 321 and 643 where the pixels of the output image 403 are to be projected in the projection region (e.g., the projection region 120 of FIG. 1 or 2) by performing data interpolation using the first position data.

The processor 410 may generate an output image 403 by processing the input image 401 based on the second position data so that the image to be projected onto the curved projection region 120 may be viewed as a planar image to the viewer (e.g., the viewer 130 of FIG. 2).

According to an example, the processor 410 may include a measurement point acquisition module 411, a projection point acquisition module 413, and/or an image correction module 415. As used herein, the term "module" (e.g., the measurement point acquisition module 411, the projection point acquisition module 413, and the image correction module 415) may include a unit implemented in hardware, software, or firmware, and may interchangeably be used with other terms, for example, "logic," "logic block," "part," or "circuitry". The "module" may be a single integral component, or a minimum unit or part thereof, adapted to perform one or more functions. For example, according to an embodiment, the module may be implemented in a form of an application-specific integrated circuit (ASIC). As shown in FIG. 4, the measurement point acquisition module 411, the projection point acquisition module 413, and the image correction module 415 may be included in the processor 410. Thus, the measurement point acquisition module 411, the projection point acquisition module 413, and the image correction module 415 may have hardware structures corresponding to the structure of the processor 410.

In an embodiment, the measurement point acquisition module 411, the projection point acquisition module 413, and the image correction module 415 may be computer codes that are loaded into the processor 410. Thus, the measurement point acquisition module 411, the projection point acquisition module 413, and the image correction module 415 may have structures corresponding to the computer codes. The measurement point acquisition module 411, the projection point acquisition module 413, and the image correction module 415 may be replaced or interchangeable with the measurement point acquisition codes, the projection point acquisition codes, and the image correction codes, respectively.

The measurement point acquisition module 411 may obtain first position data corresponding to the sensing measurement points 311 included in the projection plane 110 based on the sensing value measured by the distance sensor 420. The first position data may include first coordinate values P1(x, y, z) respectively corresponding to the sensing measurement points 311. The first coordinate value P1(x, y, z) may be a space orthogonal coordinate system obtained for the coordinate space. For example, the first coordinate value P1(x, y, z) may be defined as position data (x value, y value) corresponding to a planar orthogonal coordinate system (or two-dimensional Cartesian coordinate system) corresponding to the coordinate plane and position data (z value) corresponding to the depth or distance.

The projection point acquisition module 413 may determine second position data reflecting the curvature characteristic of the projection plane 110. According to an example, the curvature characteristic of the projection plane 110 may include information about the directionality of the wave propagating in a single direction on the projection plane 110. For example, the direction in which the wave propagates on the projection plane 110 may be a horizontal direction from left to right or from right to left. For example, the direction in which the wave propagates on the projection plane 110 may be a vertical direction from an upper side to a lower side or from a lower side to an upper side. For example, the direction in which the wave propagates from the projection plane 110 may be a first diagonal direction from the lower left corner to the upper right corner or from the upper right corner to the lower left corner. For example, the direction in which the wave propagates from the projection plane 110 may be a second diagonal direction from the upper left corner to the lower right corner or from the lower right corner to the upper left corner. As an example, in FIG. 3, the wave propagates in the horizontal direction on the projection plane 110.

According to an example, the projection point acquisition module 413 may obtain the second position data of the pixel projection points 321 by interpolating the first position data based on a predetermined interpolation method considering that the first position data of the sensing measurement points 311 is scattered data. The projection point acquisition module 413 may determine the coordinate axis (u, v) of the second coordinate plane reflecting the curvature characteristic of the projection plane 110 based on the local gradient distribution as a pre-processing process for performing interpolation on the first position data (see FIG. 6B).

Specifically, the projection point acquisition module 413 may obtain a local gradient (gx, gy) for each of the first coordinate values P1(x, y, z) of the sensing measurement points 311 and 641 on the first coordinate plane (e.g., the coordinate plane 610 of FIG. 6A).

Equation 1 below describes an operation of obtaining the local gradient (gx, gy) for each of the first coordinate values P1(x, y, z).

$$gx = \frac{\partial z}{\partial x},\ gy = \frac{\partial z}{\partial y} \qquad \text{[Equation 1]}$$

The projection point acquisition module 413 may determine the coordinate axis (u, v) of the second coordinate plane to determine the second position data by reflecting the distribution of the obtained local gradient (see FIG. 6B). The projection point acquisition module 413 may determine, e.g., the coordinate axis (u, v) of the second coordinate plane based on the eigen vector (e1, e2) related to the direction and the eigen value (L1, L2) related to the inclination based on the distribution of the obtained local gradient. The vector u and the vector v that determine the coordinate axis (u, v) may always be orthogonal. For example, the ratio of the eigen value L1 and L2 related to the inclination may determine the magnitude of the vector u and the vector v (see FIG. 8A, FIG. 8B, FIG. 8C, FIG. 8D, or FIG. 8E).

Equation 2 below describes an operation of determining the coordinate axis (u, v) of the second coordinate plane.

$$v = f\left(\frac{L2}{L1 + L2}\right) \times \frac{e2}{\|e2\|2} \qquad \text{[Equation 2]}$$

$$u = f\left(\frac{L1}{L1 + L2}\right) \times \frac{e1}{\|e1\|2}$$

Here, L1 or L2 is the eigen value related to the inclination, and e1 or e2 is the eigen vector related to the direction.

The projection point acquisition module 413 may determine the eigen vector e1, e2 related to the direction and an eigen value L1, L2 related to the inclination based on the distribution of the obtained local gradient. For example, the projection point acquisition module 413 may determine the eigen vector e1, e2, which is the axis that may most optimally compress the distribution of the local gradient and the eigen value L1, L2, which is a weight, considering the eigen analysis of the local gradient.

Equation 3 below describes an operation of determining the eigen value L1, L2 related to the inclination.

$$L1 = \frac{T}{2} + sqrt(T^2 - D)$$
$$L2 = \frac{T}{2} - sqrt(T^2 - D) \quad \text{[Equation 3]}$$

Here, T is A(1)+A(4), D is A(1)A(4)−A(2)A(3), and the covariance matrix (A) is $$\begin{bmatrix} \mathrm{Var}[gx] & \mathrm{Cov}[gx, gy] \\ \mathrm{Cov}[gx, gy] & \mathrm{Var}[gy] \end{bmatrix}.$$

Equation 4 below describes an operation of determining the eigen vectors e1 and e2 regarding the direction.

$$e1 = \begin{bmatrix} L1 - A(4) \\ A(2) \end{bmatrix}$$
$$e2 = \begin{bmatrix} L2 - A(4) \\ A(2) \end{bmatrix} \quad \text{[Equation 4]}$$

The projection point acquisition module 413 may obtain a second coordinate value (u, v), which is the second plane orthogonal coordinate system, as the second position data, by projecting the coordinate value (x, y) on the first coordinate plane included in the first coordinate values P1(x, y, z) of the sensing measurement points 311 and 641 obtained on the first coordinate plane 610 onto the second coordinate plane by a new coordinate axis (u, v).

The number of pixels (e.g., the number of pixel projection points 321 and 643 of FIG. 3 or 6D) of the image projected onto the projection region 120 of the projection plane 110 by the image projection apparatus 100 may be relatively larger than the number of sensing measurement points 311 and 641. Therefore, the projection point acquisition module 413 may obtain the position data of the pixel projection points 321 and 643 based on the position data of the sensing measurement points 311 and 641 using a specific interpolation technique.

According to an example, the projection point acquisition module 413 may obtain third position data corresponding to the plurality of pixel projection points 643 where the optical signal 403 is projected onto the projection region 120 of the projection plane 110 by performing scattered data interpolation using the second position data.

In an embodiment, the projection point acquisition module 413 may obtain the third position data corresponding to the plurality of pixel projection points 643, wherein the optical signal 403 is projected onto the plurality of pixel projection points 643 of the projection region 120 of the projection plane 110 by performing scattered data interpolation of the second position data.

For example, the scattered data interpolation method may be a natural neighbor interpolation method. The natural neighbor interpolation method may include, e.g., an area-weighted interpolation method. The area-weighted interpolation method may be a scattered data interpolation method based on "Voronoi tessellation". Voronoi tessellation is a technology that divides a specific area (e.g., the projection region 120) by a cell using each of a plurality of position data (e.g., two-dimensional position information (x, y)) present on a plane as reference position data. In this case, the internal points P2(x2, y2) included in the cell may be closer to the internal point P1(x1, y1) corresponding to the reference position data of the corresponding cell than other cells, which is described in Equation 5 below.

$$R_k = \{x \in X \mid d(x, P_k) \leq d(x, P_j) \text{ for all } j \neq k\} \quad \text{[Equation 5]}$$

Figure 7:
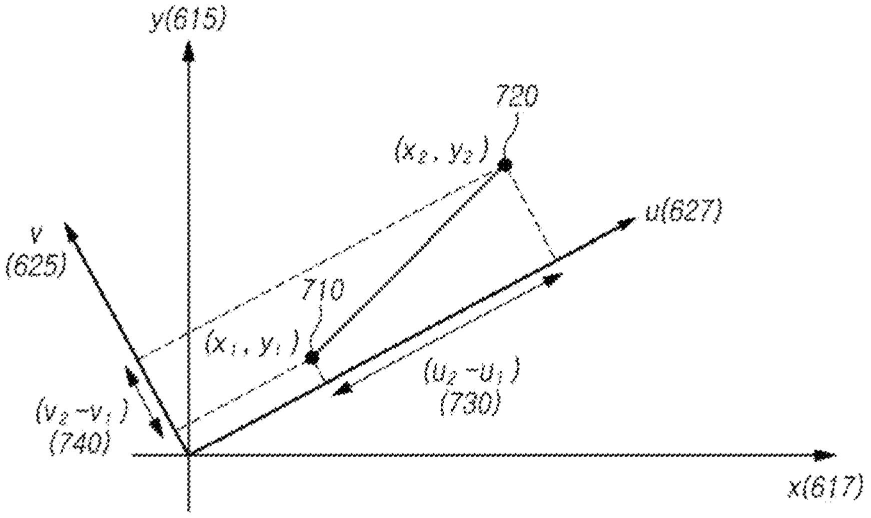
FIG. 7 is a view illustrating an example of measuring a distance between second coordinates for Voronoi tessellation.

For example, the projection point acquisition module 413 may determine the Euclidean distance as a pre-processing process as the area-weighted interpolation method is based on Voronoi tessellation (see FIG. 7). The Euclidean distance may be generally applied to cluster analysis that divides groups based on the distance between data.

Equation 6 below defines the Euclidean distance.

$$d[(x1, y1), (x2, y2)] = \sqrt{(u2 - u1)2 + (v2 - v1)2} \quad \text{[Equation 6]}$$

Here, $$u1 \text{ is } u\begin{bmatrix} x1 \\ y1 \end{bmatrix}, u2 \text{ is } u\begin{bmatrix} x2 \\ y2 \end{bmatrix}, v1 \text{ is } v\begin{bmatrix} x1 \\ y1 \end{bmatrix}, \text{ and } v2 \text{ is } v\begin{bmatrix} x2 \\ y2 \end{bmatrix}.$$

According to an example, the projection point acquisition module 413 may obtain the coordinate values (u', v') of the new position x by performing area-weighted interpolation using the second coordinate values (u, v) on the second coordinate plane, which is the second position data. For example, the projection point acquisition module 413 may multiply the coordinate values f(xi) positioned around the new position x to be obtained by the weight wi(x) and summing them to obtain the value G(x) at the new position x. Equation 7 below defines a value G(x) at the new position x.

$$G(x) = \sum_{i=1}^{n} w_i(x) f(x_i) \quad \text{[Equation 7]}$$

Here, wi(x) is $$\frac{A(x_i)}{A(x)},$$

$A(x_i)$ is the size of the intersection area between the new cell and the existing cell, and A(x) is the size of the new cell.

As described above, the value G(x) at the new position x may be calculated based on the size of an area taken from the surrounding cells by the newly generated cell at the new position x.

By repeatedly performing the above-described operation, the projection point acquisition module 413 may obtain third position data, which is a coordinate value in the coordinate space corresponding to the pixel projection points 321 and 641.

The image correction module 415 may correct the input image 401 based on the third position data obtained by the projection point acquisition module 413 so that the image to be projected onto the curved projection region 120 may be viewed as a planar image to the viewer (e.g., the viewer 130 of FIG. 2). The image correction module 415 may provide the corrected image to the image projector 440.

According to an example, the image projection apparatus 100 may include additional components such as a user I/F. For example, the user I/F may be configured to receive information from the user. The user I/F may receive a command or data to be used by other component (e.g., the processor 410) of the image projection apparatus 100, from the outside (e.g., a user) of the image projection apparatus 100. The user I/F may include, e.g., a microphone, a mouse, a keyboard, a key (e.g., a button), a remote controller, or a digital pen (e.g., a stylus pen). According to an example, the user I/F may be configured to transfer information to the user. The user I/F may output sound signals to the outside of the image projection apparatus 100 through a component such as a speaker. For example, the speaker may be used for general purposes, such as playing multimedia or playing record.

According to an example, the image projection apparatus 100 may include an additional component, such as a transceiver. The transceiver 840 may be configured to exchange information with at least one electronic device. The transceiver may transmit/receive data or signals with a remote controller or external sensors under the control of the processor 410.

According to an example, the transceiver may include, but is not limited to, a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, or a microwave (uWave) communication unit, corresponding to the performance and structure of the image projection apparatus 100.

According to an example, the transceiver may support establishing a direct (e.g., wired) communication channel or a wireless communication channel with a remote controller and performing communication through the established communication channel. The transceiver may include one or more CPs supporting direct (e.g., wired) communication or wireless communication. The one or more CPs may be operated independently of the processor 410. The transceiver may include, e.g., a wireless communication module (e.g., a cellular communication module, a short-range wireless communication module, or a global navigation satellite system (GNSS) communication module) or a wired communication module (e.g., a local area network (LAN) communication module or a power line communication module). A corresponding one of these communication modules may communicate with at least one remote controller, which is an external electronic device, via a network (e.g., a short-range communication network, such as Bluetooth™, wireless-fidelity (Wi-Fi) direct, or infrared data association (IrDA)) or a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other.

According to an example, the image projection apparatus 100 may include an external sensor as an external component. The sensing data obtained through the external sensor may include information to be used to obtain the position of the image projection apparatus 100. The processor 410 may identify the position of the image projection apparatus 100 using the sensing data. The processor 410 may image-process the input image 401 based on the position of the image projection apparatus 100 to generate an output image 403 to be projected onto the projection region 120 of the projection plane 110 through the image projector 440. The output image 403 to be projected through the image projector 440 may be an image corrected to be displayed as a flat surface without distortion due to the curved surface of the projection region 120 at the position of the image projection apparatus 100.

Figure 5:
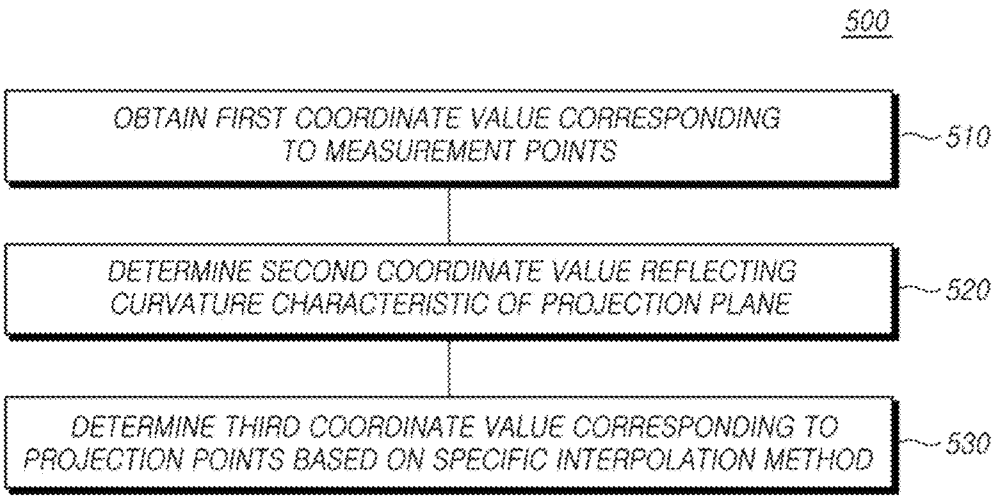
FIG. 5 is a control flowchart for obtaining position data of an area to project image data in an image projection apparatus according to an embodiment.

FIG. 5 is a control flowchart for obtaining position data of an area (e.g., the projection region 120 of FIG. 1 or 2) to project image data in an image projection apparatus (e.g., the image projection apparatus 100 of FIG. 2) according to an embodiment.

In the following embodiments, each operation may be sequentially performed, but is not necessarily performed sequentially. For example, the order of the operations may be changed, and at least two operations may be performed in parallel.

Referring to FIG. 5, in operation 510, the image projection apparatus 100 may obtain position data (hereinafter referred to as 'first position data' or 'first coordinate value') corresponding to a plurality of measurement points (e.g., the sensing measurement points 311 of FIG. 3) (hereinafter, referred to as 'sensing measurement points 311') included in the projection plane (e.g., the projection plane 110 of FIG. 1 or FIG. 2). The sensing measurement points 311 may be distributed on the projection plane 110. According to an example, when the projection plane 110 is a curved surface, the sensing measurement points 311 may not be uniformly distributed on the projection plane 110 but may be irregularly dispersed and disposed. For example, assuming at least one sensor 420 that transmits beams so that the measurement points are evenly distributed on the planar projection plane, the beams transmitted by the sensor 420 may provide a distribution of measurement points that narrow the gap in proportion to the inclination of the curved projection plane 110. In other words, the measurement points present in a highly inclined area (hereinafter, a 'first inclined surface') in the curved projection plane 110 may be distributed and disposed at relatively wider intervals compared to the measurement points present in a relatively less inclined area (hereinafter, a 'second inclined surface'). Therefore, the density of the measurement points on the first inclined surface may be relatively lower than the density of the measurement points on the second inclined surface. For example, the first inclined surface may be distinguished based on the difference in the degree of relative local gradient from the second inclined surface due to the curvature of the projection plane 110, which may be an exemplary assumption. For an example in which the sensing measurement points 331 are distributed and disposed on the projection plane 110, FIG. 3 may be referred to.

According to an example, the difference in density of measurement points between the first inclined surface and the second inclined surface may be attributed to the difference in arrival distance (z value) from the image projection apparatus 100 (or viewer (e.g., the viewer 130 of FIG. 2)) to the sensing measurement points 311 distributed on the projection plane 110 due to the curvature of the projection plane 110. The curvature of the projection plane 110 may cause the distance at which the signal (e.g., an infrared (IR)

beam) transmitted using at least one sensor (e.g., the distance sensor 420 of FIG. 4) (e.g., a time of flight (ToF) sensor) reaches the corresponding measurement point to be varied in order for the image projection apparatus 100 to obtain the first coordinate value corresponding to the sensing measurement points 311. The number of sensing measurement points 311 on the projection plane 110 may be determined by the resolution of at least one sensor 420. For example, the number of sensing measurement points 311 determined by the resolution of at least one sensor 420 may be '240×180'. For example, the number of sensing measurement points 311 determined by the resolution of at least one sensor 420 may be '640×480'. The number of pixels (e.g., the number of pixel projection points 321 of FIG. 3) of the image projected onto the projection region 120 of the projection plane 110 by the image projection apparatus 100 may be relatively larger than the number of sensing measurement points 311. According to an example, the image projection apparatus 100 may obtain the position data of the pixel projection points 321 based on the position data of the sensing measurement points 311 using a specific interpolation technique. This is described below in greater detail.

According to an example, the image projection apparatus 100 may obtain the first coordinate value P1(x, y, z) as first position data corresponding to the plurality of measurement points 641 included in the curved projection plane 110. The first coordinate value P1(x, y, z) may be a space orthogonal coordinate system obtained for the coordinate space. For example, the first coordinate value P1(x, y, z) may be defined as position data (x value, y value) corresponding to a planar orthogonal coordinate system (or two-dimensional (2D) Cartesian coordinate system) corresponding to the coordinate plane and position data (z value) corresponding to the depth or distance.

As described above, the image projection apparatus 100 may detect first position data (or first coordinate values P1(x, y, z)) in the coordinate space corresponding to the sensing measurement points 311 distributed on the projection plane 110 by at least one sensor 420.

In operation 520, the image projection apparatus 100 may determine position data (hereinafter, referred to as 'second position data' or 'second coordinate value') reflecting the curvature characteristic of the projection plane 110. For example, based on the first position data, the image projection apparatus 100 may determine the second coordinate values in the plane orthogonal coordinate system in which the distribution of the local gradient of the sensing measurement points 311 is reflected as second position data. According to an example, the curvature characteristic of the projection plane 110 may include information about the directionality of the wave propagating in a single direction on the projection plane 110. For example, the direction in which the wave propagates on the projection plane 110 may be a horizontal direction from left to right or from right to left. For example, the direction in which the wave propagates on the projection plane 110 may be a vertical direction from an upper side to a lower side or from a lower side to an upper side. For example, the direction in which the wave propagates from the projection plane 110 may be a first diagonal direction from the lower left corner to the upper right corner or from the upper right corner to the lower left corner. For example, the direction in which the wave propagates from the projection plane 110 may be a second diagonal direction from the upper left corner to the lower right corner or from the lower right corner to the upper left corner. As an example, in FIG. 3, the wave propagates in the horizontal direction on the projection plane 110.

Specifically, the image projection apparatus may obtain the local gradient (gx, gy) of the sensing measurement points 331 from a first coordinate plane by a predetermined coordinate axis (x, y) based on the first position data. The image projection apparatus 100 may determine the coordinate axis (e.g., v 625, u 627 of FIG. 6B) of the second coordinate plane to determine the second position data by reflecting the distribution of the obtained local gradient (see FIG. 6B). For example, the image projection apparatus 100 may identify the distribution of the obtained local gradient for the sensing measurement points 331 on the coordinate plane (e.g., the coordinate plane 620 of FIG. 6B) using the local gradient (gx, gy) of the sensing measurement points 331 as a coordinate axis (e.g., gy 621, gx 623 of FIG. 6B). For example, the distribution of the local gradient in the coordinate plane (e.g., the coordinate plane 620 of FIG. 6B) using the local gradient (gx, gy) as the coordinate axis (e.g., gy 621, gx 623 of FIG. 6B) may have a distribution inclined from the upper left to the lower right (see FIG. 6B). For example, the distribution of the local gradient may be affected by the curvature characteristic of the projection plane 110, i.e., the direction (or local gradient) in which the wave propagates on the projection plane 110.

The image projection apparatus 100 may determine an eigen vector related to the direction and an eigen value related to the inclination based on the distribution of the obtained local gradient. The image projection apparatus 100 may obtain the coordinate axis (u, v) of the second coordinate plane based on the eigen vector and the eigen value. For example, the image projection apparatus 100 may obtain the coordinate axis (u, v) of the second coordinate plane by Equation 1 defined above. The image projection apparatus 100 may determine the size of the coordinate axis (u, v) on the second coordinate plane by the ratio of the eigen value. The image projection apparatus 100 may determine, as the second position data, a coordinate value (u value, v value), which is a planar orthogonal coordinate system corresponding to the first coordinate value P1(x, y, z), which is the first position data on the second coordinate plane.

As described above, the image projection apparatus 100 may determine the second position data in the coordinate plane reflecting the curvature characteristic of the projection plane 110 based on the first position data. According to an example, the image projection apparatus 100 may obtain the local gradient of the sensing measurement points 331 on the first coordinate plane based on the first position data. The image projection apparatus 100 may determine the coordinate axis (u, v) of the second coordinate plane to determine the second position data by reflecting the distribution of the obtained local gradient. For example, the image projection apparatus 100 may determine an eigen vector related to the direction and an eigen value related to the inclination based on the distribution of the obtained local gradient. The image projection apparatus 100 may obtain the coordinate axis (u, v) of the second coordinate plane based on the eigen vector and the eigen value. The image projection apparatus 100 may determine the size of the coordinate axis (u, v) on the second coordinate plane by, e.g., the ratio of the eigen value.

In operation 530, the image projection apparatus 100 may perform data interpolation (e.g., scattered data interpolation) using the second position data to obtain third position data corresponding to the pixel projection points 643 where the optical signal 403 is projected onto the projection region 120 of the projection plane 110. The third position data may include a space orthogonal coordinate system corresponding to the position of each of the pixel projection points 321 in the coordinate space. For example, the scattered data interpolation method may be a natural neighbor interpolation method. The natural neighbor interpolation method may include, e.g., an area-weighted interpolation method. The area-weighted interpolation method may be a scattered data interpolation method based on "Voronoi tessellation". Voronoi tessellation is a technology that divides a specific area (e.g., the projection region 120) by a cell using each of a plurality of position data (e.g., two-dimensional position information (x, y)) present on a plane as reference position data. In this case, the internal points included in the cell may be closer to the internal point corresponding to the reference position data of the corresponding cell than other cells.

As described above, the image projection apparatus 100 may identify the planar orthogonal coordinate system (u, v) of the sensing measurement points 311 on the second coordinate plane based on the second position data, and determine the distance between the sensing measurement points 311 on the second coordinate plane using the identified planar orthogonal coordinate system (u, v). The image projection apparatus 100 may obtain second cells corresponding to the pixel projection points 321 by performing Voronoi tessellation based on the determined distance between the sensing measurement points 641, and performing scattered data interpolation on the first cells obtained as a result of the Voronoi tessellation. The shape of the first cells and/or the second cells may narrow in a direction in which the inclination is present on the projection plane 110 according to the curvature characteristic (see FIG. 8A, FIG. 8B, FIG. 8C, FIG. 8D, and FIG. 8E).

FIG. 6A is a view illustrating a local gradient distribution of sensing measurement points (e.g., the measurement point 311 of FIG. 3) on a first coordinate plane. FIG. 6B is a view illustrating an operation of obtaining a new coordinate axis (u, v) based on a local gradient distribution on a second coordinate plane. FIG. 6C is a view illustrating the result of Voronoi tessellation. FIG. 6D is a view illustrating obtaining pixel projection points by performing data interpolation.

The first graph 610 of FIG. 6A) illustrates the distribution of each sensing measurement point 611 and the distribution of the local gradient (gx, gy) based on the first position data corresponding to the sensing measurement points 331 on the first coordinate plane by the predetermined coordinate axes (x, y) 617 and 615. Each sensing measurement point 611 may be irregularly distributed and disposed on the first coordinate plane. It may be identified that the local gradient at each sensing measurement point 611 reflects the curvature characteristic of the projection plane 110 to have a predetermined directionality 613.

The second graph 620 of FIG. 6B illustrates the distribution of local gradient (gx, gy) values using the local gradient (gx, gy) of the sensing measurement points 611 as the coordinate axis. The distribution of the local gradient (gx, gy) values illustrated in the second graph 620 reflects the curvature characteristic of the projection plane 110. The two vectors (u, v) 627 and 625 to be defined as coordinate axes for the second coordinate plane 629 may be determined based on the distribution of local gradient (gx, gy) values reflecting the curvature characteristic that may be identified by the second graph 620.

The third graph 630 of FIG. 6C illustrates a cell structure 631 corresponding to the result of performing Voronoi tessellation using the second coordinate value (u, v) corresponding to each sensing measurement point 611 on the second coordinate plane 629 by the new coordinate axis (u, v) (627, 625). The illustrated cell structure 631 may narrow in a direction in which the local gradient is present on the projection plane 110 according to the curvature characteristic.

The fourth graph 640 FIG. 6D illustrates pixel projection points 643 obtained by performing scattered data interpolation on the second coordinate value (u, v) corresponding to each sensing measurement point 611 on the second coordinate plane 629 by the new coordinate axis (u, v) 627 and 625.

FIG. 7 is a view illustrating an example of measuring a distance between second coordinates for Voronoi tessellation.

Referring to FIG. 7, the 1a-th coordinate value (x1, y1) on the first coordinate plane (e.g., the coordinate plane 610 of FIG. 6A) corresponding to the first sensing measurement point 710 may be projected as the 1b-th coordinate value (u1, v1) on the second coordinate plane (e.g., the coordinate plane 620 of FIG. 6B). The 2a-th coordinate values (x2, y2) on the first coordinate plane corresponding to the second sensing measurement point 720 may be projected as the 2b-th coordinate value (u2, v2) on the second coordinate plane. For example, the 1a-th coordinate value (x1, y1) and the 2a-th coordinate values (x2, y2) on the first coordinate plane may be substituted into the second coordinate plane to obtain the 1b-th coordinate value (ul, v1) and the 2b-th coordinate value (u2, v2) as two vector values (u, v).

According to an example, the distance (d[(x1,y1), (x2, y2)]) between the first coordinates may be calculated by the distance between the 1b-th coordinate value (ul, v1) and the 2b-th coordinate value (u2, v2) corresponding to the second coordinates. For example, the distance between the 1b-th coordinate value (ul, v1) and the 2b-th coordinate value (u2, v2) may be calculated by the definition in Equation 6.

FIG. 8A, FIG. 8B, FIG. 8C, FIG. 8D, and FIG. 8E are views illustrating a change in cell shape according to a curvature characteristic of a projection plane (e.g., the projection plane 110 of FIG. 1 or 2).

Referring to FIG. 8A, FIG. 8B, FIG. 8C, FIG. 8D, and FIG. 8E, the eigen value related to the inclination which reflects the curvature characteristic may influence determination of the size of the coordinate axis (u, v) of the corresponding coordinate plane. For example, if the ratio of the eigen value on the coordinate axis u increases, the length of the coordinate axis u decreases, and if the ratio of the eigen value on the coordinate axis u decreases, the length of the coordinate axis u increases. For example, if the ratio of the eigen value on the coordinate axis v increases, the length of the coordinate axis v decreases, and if the ratio of the eigen value on the coordinate axis v decreases, the length of the coordinate axis v increases. According to an example, the ratio of the eigen value increases as the local gradient of the inclined surface increases, and decreases as the local gradient of the inclined surface decreases. Therefore, the cell according to the result of Voronoi tessellation may have a shape that narrows in the direction in which the local gradient is present on the projection plane 110 due to the change in the ratio of the eigen value according to the curvature characteristic.

Figure 8A:
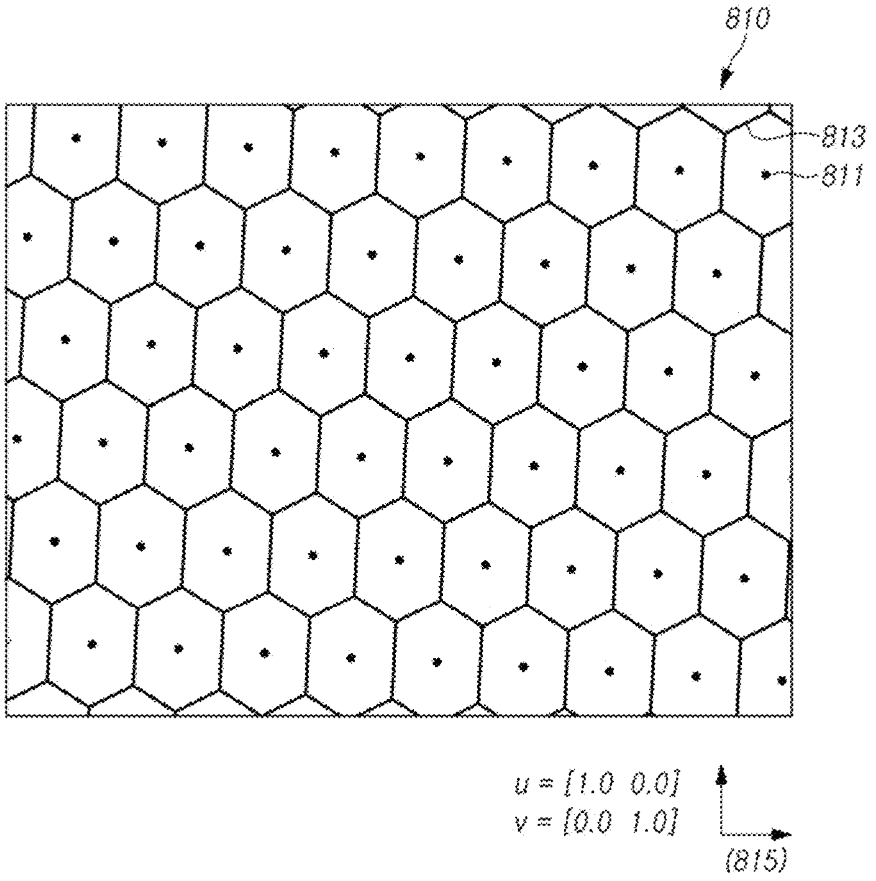
FIG. 8A, FIG. 8B, FIG. 8C, FIG. 8D, and FIG. 8E are views illustrating a change in cell shape according to a curvature characteristic of a projection plane.
Figure 8B:
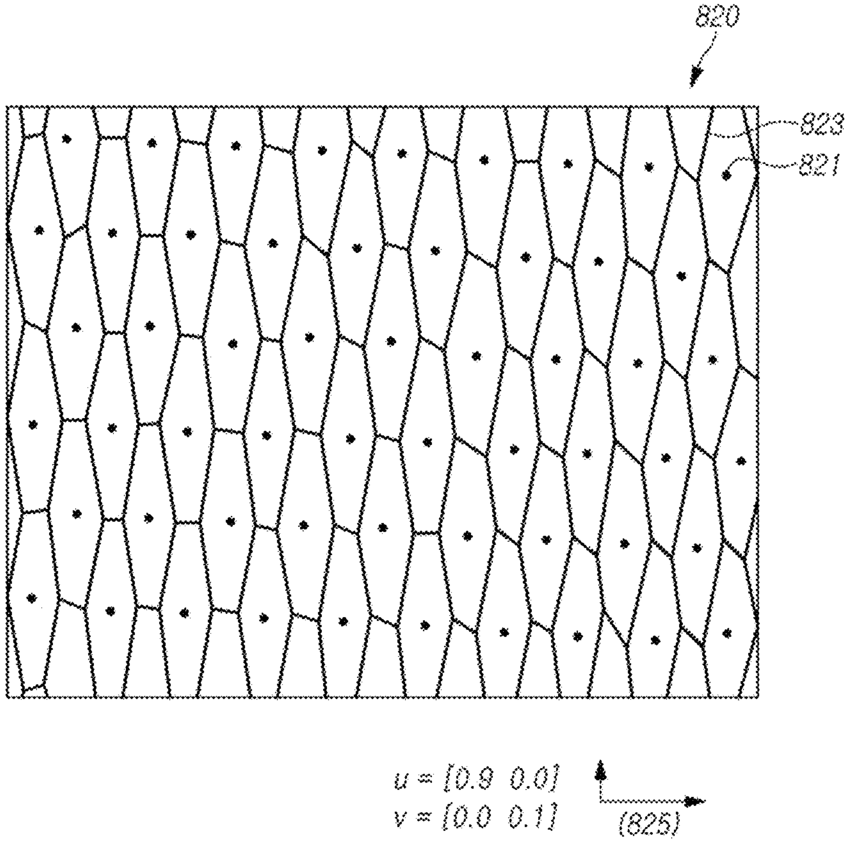
Figure 8C:
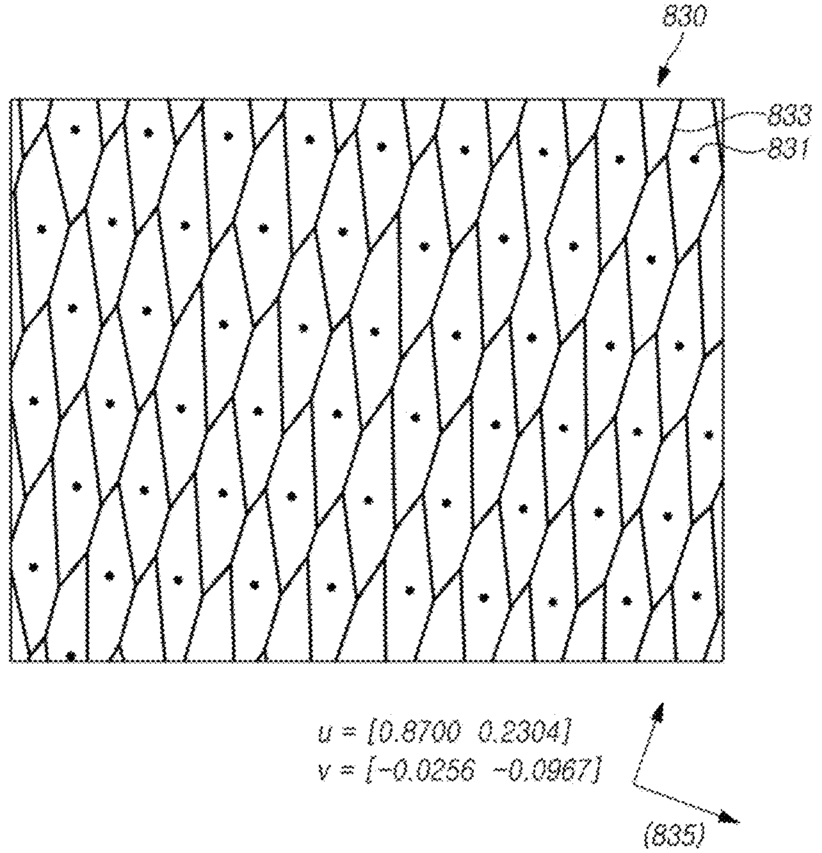
Figure 8D:
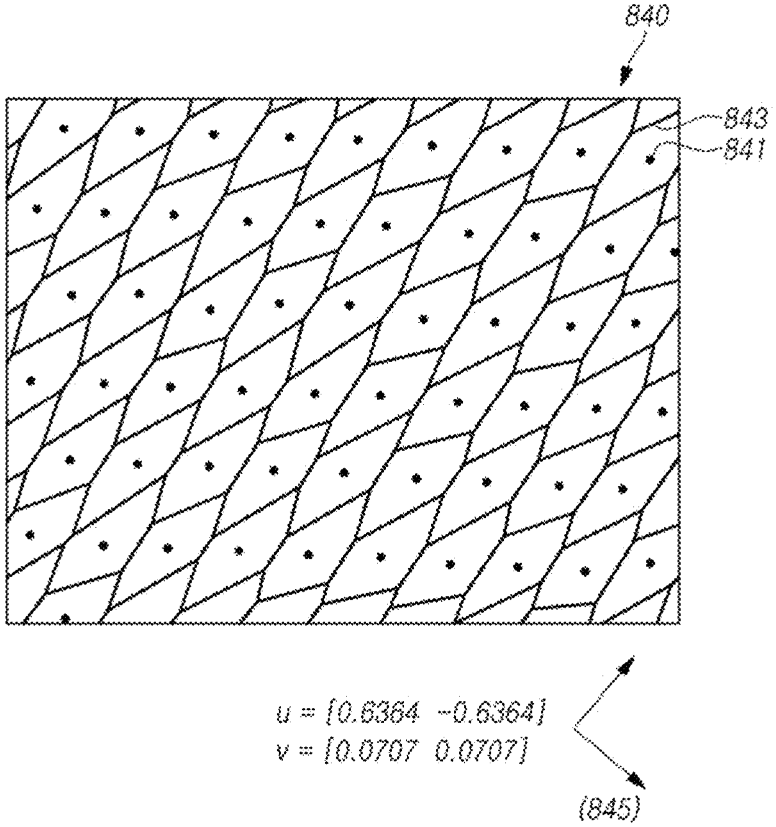
Figure 8E:
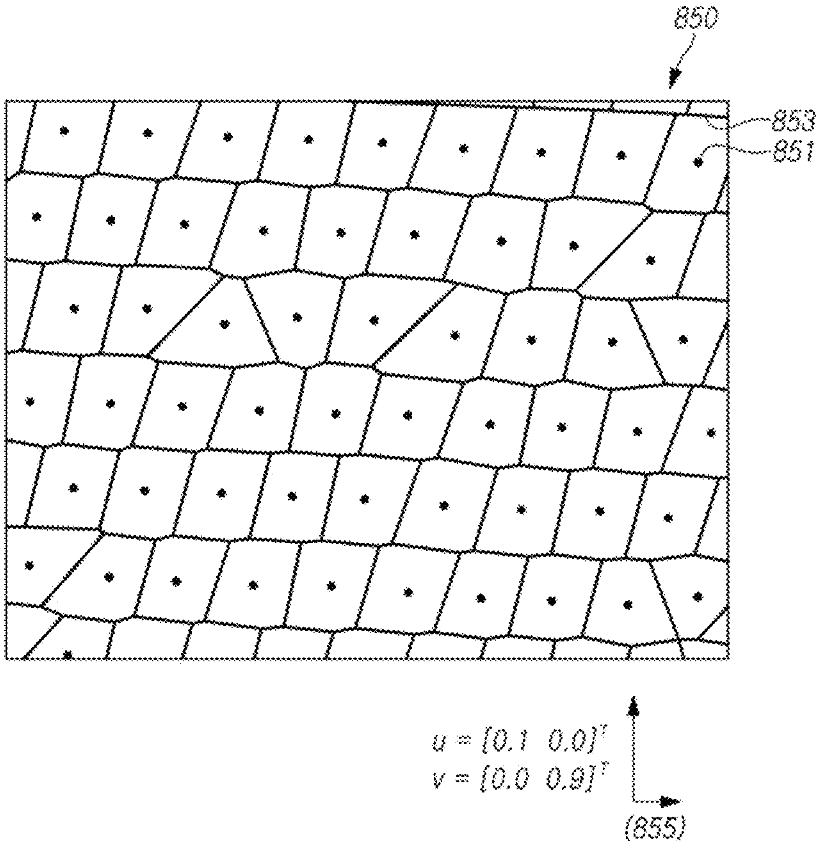

For example, if the projection plane 110 is a flat surface with no local gradient, the size of the coordinate axis (u, v) may be the same (815) so that it may have a uniform shape with the cell 813 corresponding to the sensing measurement points 811 (see FIG. 8A). For example, it may be identified that the ratio of the eigen value on the coordinate axis u and/or the ratio of the eigen value on the coordinate axis v changes in response to a change in the inclination and/or direction of the local gradient on the projection plane 110.

Thus, as the image output by the image projection apparatus 100 may be corrected by reflecting the curvature characteristic of the projection plane 110, the viewer may view an image without distortion even on the curved projection plane 110.

Figure 9A:
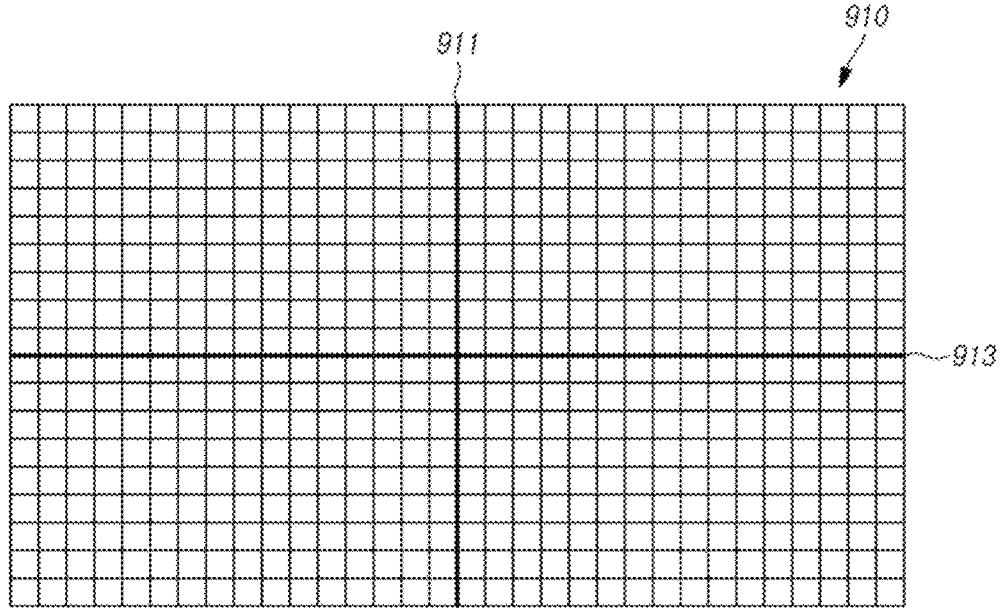
FIG. 9A is a view illustrating an undistorted input image input to an image projection apparatus.
Figure 9B:
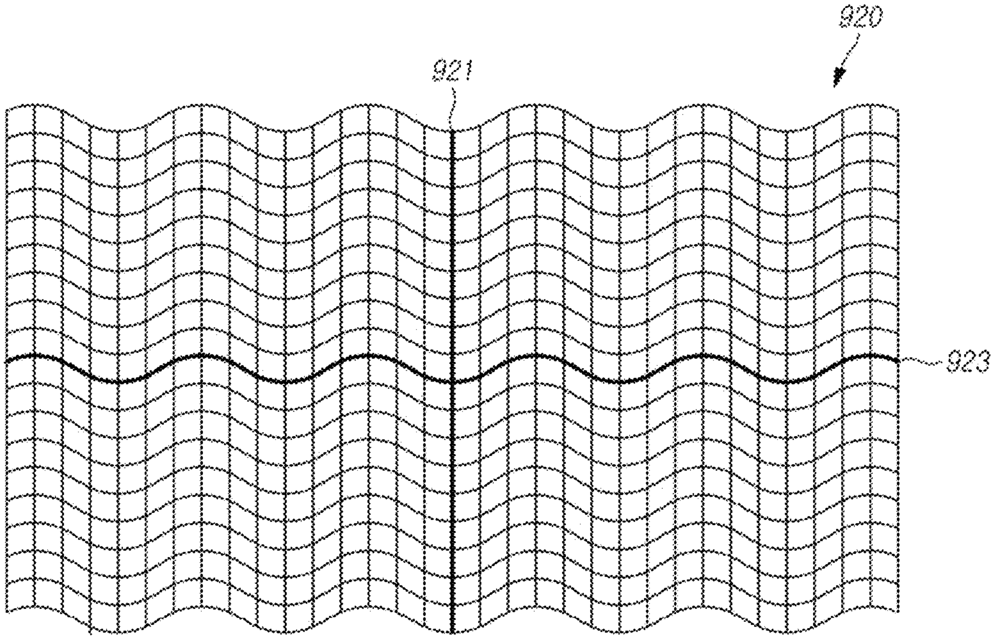
FIG. 9B is a view illustrating an image displayed when an image projection apparatus projects an input image onto a curved projection plane without correction.
Figure 9C:
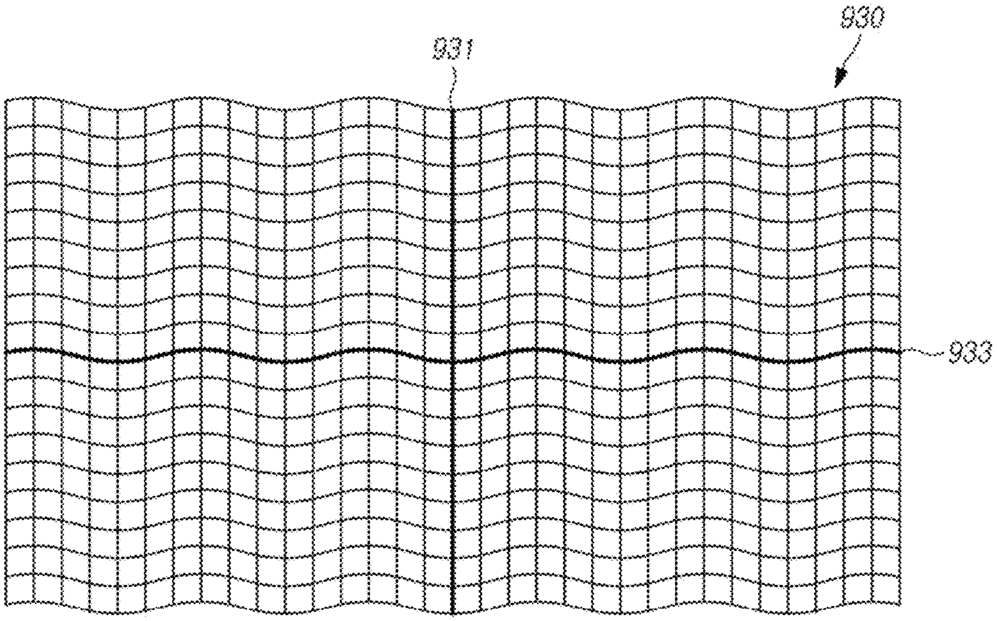
FIG. 9C is a view illustrating an image displayed when an image projection apparatus corrects an input image without considering a curvature characteristic of a projection plane and projects the input image onto the projection plane.
Figure 9D:
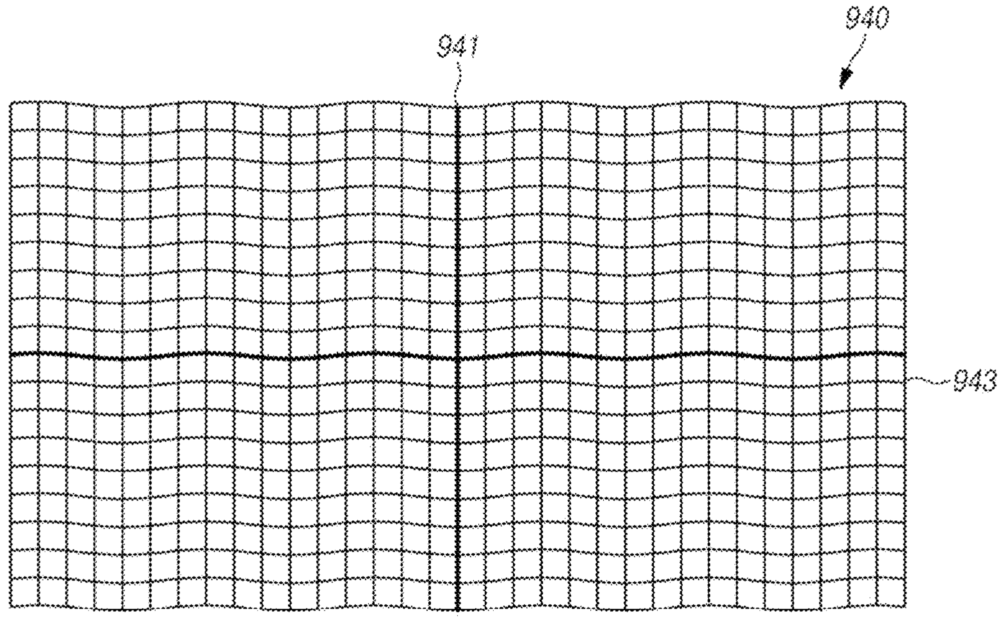
FIG. 9D is a view illustrating an image displayed when an image projection apparatus corrects an input image considering a curvature characteristic of a projection plane and then projects the input image on the projection plane.

FIG. 9A is a view illustrating an undistorted input image input to an image projection apparatus (the image projection apparatus 100 of FIG. 2). FIG. 9B is a view illustrating an image 920 displayed when an image projection apparatus 100 projects an input image 910 onto a curved projection plane 110 without correction. FIG. 9C is a view illustrating an image 930 displayed when an image projection apparatus 100 corrects an input image 910 without considering a curvature characteristic of a projection plane 110 and projects the input image onto the projection plane 110. FIG. 9D is a view illustrating an image 940 displayed when an image projection apparatus 100 corrects an input image 910 considering a curvature characteristic of a projection plane 110 and then projects the input image on the projection plane 110.

The vertical axes 921, 931, and 941, and/or the horizontal axes 923, 933, and 943 exhibit the most severe distortion when no correction is performed in the displayed images 920, 930, and 940 illustrated in FIGS. 9B and 9C. Further, the vertical axes 921, 931, and 941, and/or horizontal axes 923, 933, and 943 exhibit relatively less distortion when correction is performed considering the curvature characteristic of the projection plane 110 in the displayed images 920, 930, and 940.

Figure 10:
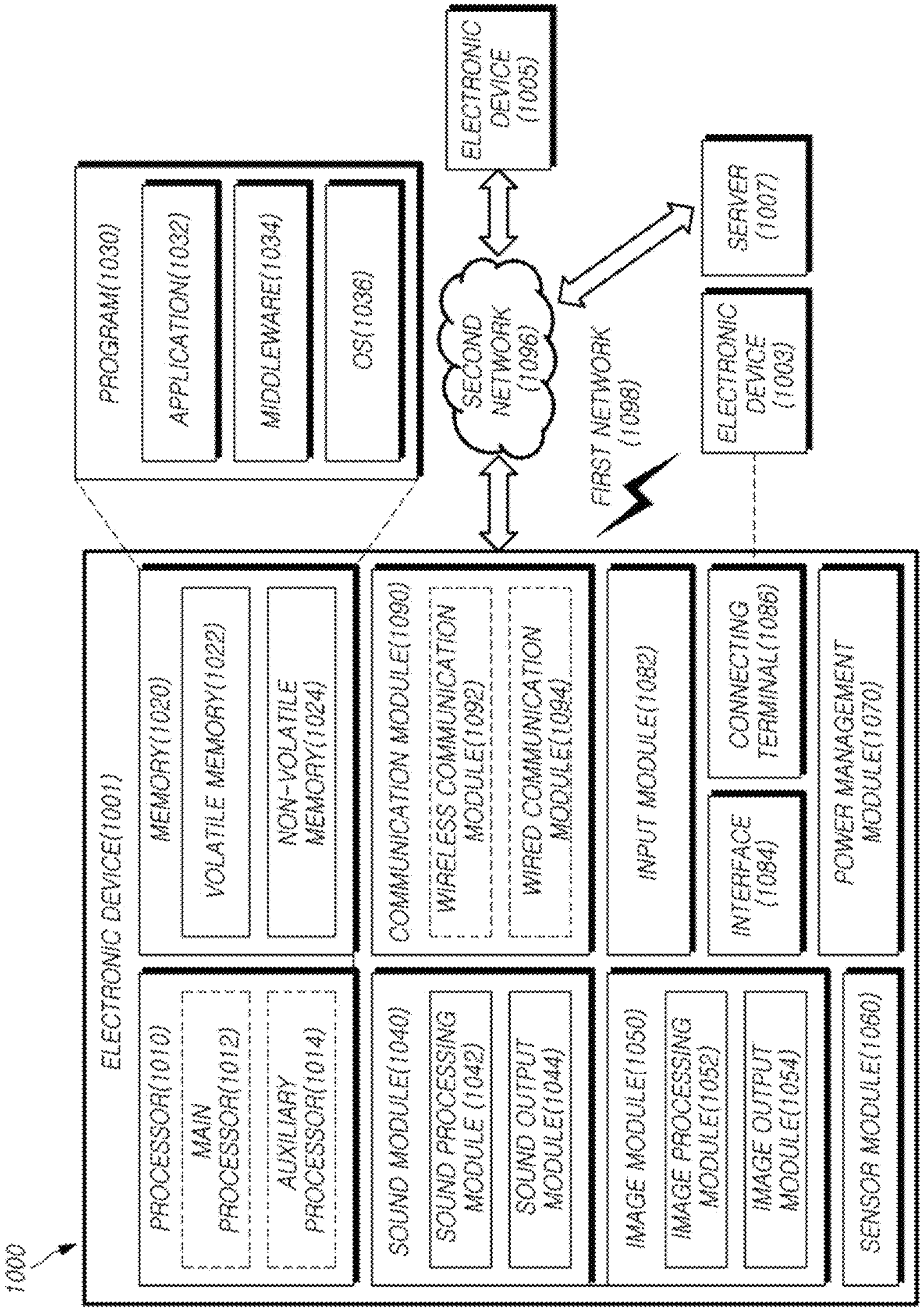
FIG. 10 is a view illustrating an electronic device in a network environment according to one or more embodiments.

FIG. 10 is a block diagram illustrating an electronic device 1001 (e.g., the image projection apparatus 100 of FIG. 2) in a network environment 1000 according to one or more embodiments.

Referring to FIG. 10, the electronic device 1001 in the network environment 1000 may communicate with at least one of an electronic device 1003 via a first network 1098 (e.g., a short-range wireless communication network), or an electronic device 1005 or a server 1007 via a second network 1096 (e.g., a long-range wireless communication network). According to an example, the electronic device 1001 may communicate with the electronic device 1005 via the server 1007. According to an example, the electronic device 1001 may include a processor 1010, memory 1020, a sound module 1040, an image module 1050, a sensor module 1060, a power management module 1070, an input module 1082, an interface 1084, a connecting terminal 1086, or a communication module 1090. In an example, at least one (e.g., the input module 1082) of the components may be omitted from the electronic device 1001, or one or more other components may be added in the electronic device 1001. In an example, some of these components may be integrated into one component.

The processor 1010 may execute, for example, software (e.g., a program 1030) to control at least one other component (e.g., a hardware or software component) of the electronic device 1001 coupled with the processor 1010, and may perform various data processing or computation. According to an example, as at least part of the data processing or computation, the processor 1010 may store a command or data received from another component (e.g., the sensor module 1060 or the communication module 1090) in volatile memory 1022, process the command or the data stored in the volatile memory 1022, and store resulting data in non-volatile memory 1024. According to an example, the processor 1010 may include a main processor 1012 (e.g., a CPU or an AP), or an auxiliary processor 1014 (e.g., a GPU, a NPU, an ISP, a sensor hub processor, or a CP) that is operable independently from, or in conjunction with, the main processor 1012. For example, when the electronic device 1001 includes the main processor 1012 and the auxiliary processor 1014, the auxiliary processor 1014 may be configured to use lower power than the main processor 1012 or to be specified for a designated function. The auxiliary processor 1014 may be implemented as separate from, or as part of the main processor 1012.

The auxiliary processor 1014 may control at least some of functions or states related to at least one component (e.g., the sensor module 1060 or the communication module 1090) among the components of the electronic device 1001, instead of the main processor 1012 while the main processor 1012 is in an inactive (e.g., sleep) state, or together with the main processor 1012 while the main processor 1012 is in an active state (e.g., executing an application). According to an example, the auxiliary processor 1014 (e.g., an ISP or a CP) may be implemented as part of another component (e.g., the communication module 1090) functionally related to the auxiliary processor 123. According to an example, the auxiliary processor 1014 (e.g., the NPU) may include a hardware structure specified for artificial intelligence model processing. The artificial intelligence model may be generated via machine learning. Such learning may be performed, e.g., by the electronic device 1001 where the artificial intelligence is performed or via a separate server (e.g., the server 1007). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1020 may store various data used by at least one component (e.g., the processor 1010 or the sensor module 1060) of the electronic device 1001. The various data may include, for example, software (e.g., the program 1030) and input data or output data for a command related thereto. The memory 1020 may include the volatile memory 1022 or the non-volatile memory 1024.

The program 1030 may be stored in the memory 1020 as software, and may include, for example, an operating system (OS) 1036, middleware 1034, or an application 1032.

The input module 1082 may receive a command or data to be used by other component (e.g., the processor 1010) of the electronic device 1001, from the outside (e.g., a user) of the electronic device 1001. The input module 1082 may include, for example, a microphone, a mouse, a keyboard, keys (e.g., buttons), or a digital pen (e.g., a stylus pen).

The sound module 1040 may include a sound processing module 1042 or a sound output module 1044. The sound output module 1044 may output audio signals to the outside of the electronic device 1001. The sound output module 1044 may include, e.g., a speaker. The speaker may be used for general purposes, such as playing multimedia or playing record. The sound processing module 1042 may convert a sound into an electrical signal and vice versa. According to an example, the sound module 1040 may obtain the sound via the input module 1082, or output the sound via the sound output module 1044 or a headphone of an external electronic device (e.g., the electronic device 1003) directly (e.g., through a wire or wires) or wirelessly coupled with the electronic device 1001.

The image module 1050 may include an image processing module 1052 or an image output module 1054. The image processing module 1052 may output video signals to the outside of the electronic device 1001. The image output module 1054 may include, e.g., a display and/or a light projector. The light projector may convert electrical video signals into optical signals and output them. The image processing module 1052 may convert an image into an electrical signal, or may convert an electrical signal into an image. According to an example, the image module 1050 may obtain the image through the input module 1082, or output the image through the image output module 1054 or an external electronic device (e.g., the electronic device 1003) directly or wirelessly connected with the electronic device 1001. The image module 1050 may include, for example, a display, a hologram device, or a projector and control circuitry to control a corresponding one of the display, hologram device, and projector.

The sensor module 1060 may detect an operational state (e.g., power or temperature) of the electronic device 1001 or an environmental state (e.g., a state of a user) external to the electronic device 1001, and then generate an electrical signal or data value corresponding to the detected state. According to an example, the sensor module 1060 may include, e.g., a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1084 may support one or more specified protocols to be used for the electronic device 1001 to be coupled with the external electronic device (e.g., the electronic device 1003) directly (e.g., through a wire or wires) or wirelessly. The interface 1084 may include, e.g., a high definition multimedia interface (HDMI), a universal serial bus (USB) interface, a secure digital (SD) card interface, or an audio interface (e.g., Bixby).

A connecting terminal 1086 may include a connector via which the electronic device 1001 may be physically connected with the external electronic device (e.g., the electronic device 1003). According to an example, the connecting terminal 1086 may include, for example, a HDMI connector, a USB connector, a SD card connector, or an audio connector (e.g., a headphone connector).

The power management module 1070 may manage power supplied to the electronic device 1001. According to an embodiment, the power management module 1070 may be implemented as at least part of, for example, a power management integrated circuit (PMIC).

The communication module 1090 may support establishing a direct (e.g., wired) communication channel or a wireless communication channel between the electronic device 1001 and the external electronic device (e.g., the electronic device 1003, the electronic device 1005, or the server 1007) and performing communication via the established communication channel. The communication module 1090 may include one or more CPs that are operable independently from the processor 1010 (e.g., the AP) and supports a direct (e.g., through a wire or wires) communication or a wireless communication. According to an example, the communication module 1090 may include a wireless communication module 1092 (e.g., a cellular communication module, a short-range wireless communication module, or a GNSS communication module) or a wired communication module 1094 (e.g., a LAN communication module or a power line communication (PLC) module). A corresponding one of these communication modules may communicate with the external electronic device 1005 via a first network 1098 (e.g., a short-range communication network, such as Bluetooth™, wireless-fidelity (Wi-Fi) direct, or infrared data association (IrDA)) or a second network 1096 (e.g., a long-range communication network, such as a legacy cellular network, a 5G network, a next-generation communication network, the Internet, or a computer network (e.g., LAN or WAN). These various types of communication modules may be implemented as a single component (e.g., a single chip), or may be implemented as multi components (e.g., multi chips) separate from each other. The wireless communication module 1092 may identify or authenticate the electronic device 1001 in a communication network, such as the first network 1098 or the second network 1096, using subscriber information (e.g., international mobile subscriber identity (IMSI)).

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1096). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example, commands or data may be transmitted or received between the electronic device 1001 and the external electronic device 1005 via the server 1007 coupled with the second network 1096. The external electronic devices 1003 or 1005 each may be a device of the same or a different type from the electronic device 1001. According to an example, all or some of operations to be executed at the electronic device 1001 may be executed at one or more of the external electronic devices 1003, 1005, or 1007. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra-low-latency services using, e.g., distributed computing or mobile edge computing. In an embodiment, the external electronic device 1005 may include an internet-of-things (IoT) device. The server 1007 may be an intelligent server using machine learning and/or a neural network. According to an example, the external electronic device 1005 or the server 1007 may be included in the second network 1096. The electronic device 1001 may be applied to intelligent services (e.g., smart home, smart city, smart car, or health-care) based on 5G communication technology or IoT-related technology.

According to an example, the image projection apparatus 100 may comprise at least one sensor (e.g., ToF) 420. The image projection apparatus 100 may comprise at least one memory 430 including a non-volatile storage medium storing instructions. The image projection apparatus 100 may comprise an image projector 440 configured to project an optical signal 403 corresponding to an output image onto a projection plane 110. The image projection apparatus 100 may comprise at least one processor 410 including a processing circuit. When executed individually or collectively by the at least one processor 410, the instructions may cause the image projection apparatus 100 to perform at least one operation. The at least one operation may comprise detecting first position data 619 in a coordinate space corresponding to a plurality of sensing measurement points 641 distributed on the projection plane 110 by the at least one sensor 420. The at least one operation may comprise determining second position data in a coordinate plane reflecting a curvature characteristic of the projection plane 110 based on the first position data 619. The at least one operation may comprise obtaining third position data corresponding to a plurality of pixel projection points 643 where the optical signal 403 is projected onto a projection region 120 of the projection plane 110 by performing area-weighted interpolation using the second position data.

According to an example, when executed individually or collectively by the at least one processor, the instructions may cause the image projection apparatus 100 to obtain a local gradient of the plurality of sensing measurement points 641 on a first coordinate plane based on the first position data 619.

According to an example, when executed individually or collectively by the at least one processor, the instructions may cause the image projection apparatus 100 to determine a coordinate axis (u, v) of a second coordinate plane for determining the second position data by reflecting a distribution of the obtained local gradient.

According to an example, when executed individually or collectively by the at least one processor, the instructions may cause the image projection apparatus 100 to determine an eigen vector related to a direction and an eigen value related to an inclination based on the distribution of the obtained local gradient.

According to an example, when executed individually or collectively by the at least one processor, the instructions may cause the image projection apparatus 100 to determine the coordinate axis (u, v) of the second coordinate plane based on the eigen vector and the eigen value.

According to an example, when executed individually or collectively by the at least one processor, the instructions may cause the image projection apparatus 100 to determine a size of the coordinate axis (u, v) on the second coordinate plane based on a ratio of the eigen value.

According to an example, when executed individually or collectively by the at least one processor, the instructions may cause the image projection apparatus 100 to identify a planar orthogonal coordinate system u, v of the plurality of sensing measurement points 641 on the second coordinate plane based on the second position data.

According to an example, when executed individually or collectively by the at least one processor, the instructions may cause the image projection apparatus 100 to determine a distance between the plurality of sensing measurement points 641 on the second coordinate plane using the identified planar orthogonal coordinate system (u, v).

According to an example, when executed individually or collectively by the at least one processor, the instructions may cause the image projection apparatus 100 to perform Voronoi tessellation based on the determined distance between the determined plurality of sensing measurement points 641.

According to an example, when executed individually or collectively by the at least one processor, the instructions may cause the image projection apparatus 100 to perform scattered data interpolation on first cells obtained as a result of the Voronoi tessellation to obtain second cells corresponding to the plurality of pixel projection points 643.

According to an example, a shape of the first cells and/or the second cells may narrow in a direction in which a local gradient is present on the projection plane 110 according to the curvature characteristic.

According to an example, the curvature characteristic of the projection plane 110 may include information about a directionality of a wave propagating in a single direction on the projection plane 110.

According to an example, a method for operating an image projection apparatus 100 may comprise detecting first position data 619 in a coordinate space corresponding to a plurality of sensing measurement points 641 distributed on a projection plane 110 where an optical signal 403 corresponding to an output image is projected by at least one sensor 420. The operation method may comprise determining second position data in a coordinate plane reflecting a curvature characteristic of the projection plane 110 based on the first position data 619. The operation method may comprise obtaining third position data corresponding to a plurality of pixel projection points 643 where the optical signal 403 is projected onto a projection region 120 of the projection plane 110 by performing area-weighted interpolation using the second position data.

According to an example, obtaining the second position data may include obtaining a local gradient of the plurality of sensing measurement points 641 on a first coordinate plane based on the first position data 619.

According to an example, determining the second position data may include determining a coordinate axis (u, v) of a second coordinate plane for determining the second position data by reflecting a distribution of the obtained local gradient.

According to an example, determining the coordinate axis (u, v) of the second coordinate plane may include determining an eigen vector related to a direction and an eigen value related to an inclination based on the distribution of the obtained local gradient.

According to an example, determining the coordinate axis (u, v) of the second coordinate plane may include obtaining the coordinate axis (u, v) of the second coordinate plane based on the eigen vector and the eigen value.

According to an example, obtaining the coordinate axis (u, v) of the second coordinate plane may include determining a size of the coordinate axis (u, v) on the second coordinate plane based on a ratio of the eigen value.

According to an example, obtaining the third position data may include identifying a planar orthogonal coordinate system (u, v) of the plurality of sensing measurement points 641 on the second coordinate plane based on the second position data.

According to an example, obtaining the third position data may include determining a distance between the plurality of sensing measurement points 641 on the second coordinate plane using the identified planar orthogonal coordinate system (u, v).

According to an example, obtaining the third position data may include performing Voronoi tessellation based on the determined distance between the determined plurality of sensing measurement points 641.

According to an example, obtaining the third position data may include performing scattered data interpolation on first cells obtained as a result of the Voronoi tessellation to obtain second cells corresponding to the plurality of pixel projection points 643.

According to an example, a shape of the first cells and/or the second cells may narrow in a direction in which a local gradient is present on the projection plane 110 according to the curvature characteristic.

According to an example, the curvature characteristic of the projection plane 110 may include information about a directivity of a wave propagating in a single direction on the projection plane 110.

According to an example, there may be provided a storage medium storing computer-readable instructions. When executed by at least a portion of at least one processor included in the image projection apparatus 100, the instructions may cause the image projection apparatus (100) to perform at least one operation. The at least one operation may comprise detecting first position data 619 in a coordinate space corresponding to a plurality of sensing measurement points 641 distributed on a projection plane 110 where an optical signal 403 corresponding to an output image is projected by at least one sensor 420. The at least one operation may comprise determining second position data in a coordinate plane reflecting a curvature characteristic of the projection plane 110 based on the first position data 619. The at least one operation may comprise obtaining third position data corresponding to a plurality of pixel projection points 643 where the optical signal 403 is projected onto a projection region 120 of the projection plane 110 by performing area-weighted interpolation using the second position data.

According to an example, obtaining the second position data may include obtaining a local gradient of the plurality of sensing measurement points 641 on a first coordinate plane based on the first position data 619.

According to an example, determining the second position data may include determining an eigen vector related to a direction and an eigen value related to an inclination based on the distribution of the obtained local gradient.

According to an example, determining the second position data may include obtaining a coordinate axis (u, v) of a second coordinate plane for determining the second position data based on the eigen vector and the eigen value.

According to an example, a size of the coordinate axis (u, v) may be determined by a ratio of the eigen value.

According to an example, obtaining the third position data may include identifying a planar orthogonal coordinate system (u, v) of the plurality of sensing measurement points 641 on the second coordinate plane based on the second position data.

According to an example, obtaining the third position data may include determining a distance between the plurality of sensing measurement points 641 on the second coordinate plane using the identified planar orthogonal coordinate system (u, v).

According to an example, obtaining the third position data may include performing Voronoi tessellation based on the determined distance between the determined plurality of sensing measurement points 641.

According to an example, obtaining the third position data may include performing scattered data interpolation on first cells obtained as a result of the Voronoi tessellation to obtain second cells corresponding to the plurality of pixel projection points 643.

According to an example, a shape of the first cells and/or the second cells may narrow in a direction in which a local gradient is present on the projection plane 110 according to the curvature characteristic.

According to an example, the curvature characteristic of the projection plane 110 may include information about a directivity of a wave propagating in a single direction on the projection plane 110.

The electronic device according to various embodiments may be one of various types of electronic devices. The electronic devices may include, for example, a display device (e.g., a TV, a monitor, or a light projection device), a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., through a wire or wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., the memory 430) that is readable by a machine (e.g., the image projection apparatus 100). For example, a processor (e.g., the processor 410) of the machine (e.g., the image projection apparatus 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An image projection apparatus comprising:

at least one sensor;

at least one memory comprising a non-volatile storage medium storing instructions;

an image projector configured to project an optical signal corresponding to an output image onto a projection plane; and at least one processor operatively connected with the at least one sensor, the at least one memory, and the image projector and including a processing circuit, wherein the instructions, when executed by the at least one processor individually or collectively, cause the image projection apparatus to:

detect, using the at least one sensor, first position data in a coordinate space corresponding to a plurality of sensing measurement points on the projection plane;

determine second position data in a coordinate plane reflecting a curvature characteristic of the projection plane, based on the first position data; and obtain third position data corresponding to a plurality of pixel projection points, wherein the optical signal is projected onto the plurality of pixel projection points of a projection region of the projection plane by performing area-weighted interpolation of the second position data.

2. The image projection apparatus of claim 1, wherein the instructions when, executed by the at least one processor individually or collectively, further cause the image projection apparatus to:

obtain a local gradient of the plurality of sensing measurement points on a first coordinate plane, based on the first position data; and determine a coordinate axis (u, v) of a second coordinate plane for determining the second position data by reflecting a distribution of the obtained local gradient.

3. The image projection apparatus of claim 2, wherein the instructions, when executed by the at least one processor individually or collectively, further cause the image projection apparatus to:

determine an eigen vector related to a direction and an eigen value related to an inclination, based on the distribution of the obtained local gradient; and determine the coordinate axis of the second coordinate plane, based on the eigen vector and the eigen value.

4. The image projection apparatus of claim 3, wherein the instructions, when executed by the at least one processor individually or collectively, further cause the image projection apparatus to determine a size of the coordinate axis on the second coordinate plane, based on a ratio of the eigen value.

5. The image projection apparatus of claim 2, wherein the instructions, when executed by the at least one processor individually or collectively, further cause the image projection apparatus to:

identify a planar orthogonal coordinate system of the plurality of sensing measurement points on the second coordinate plane, based on the second position data; and determine a distance between the plurality of sensing measurement points on the second coordinate plane using the identified planar orthogonal coordinate system.

6. The image projection apparatus of claim 5, wherein the instructions, when executed by the at least one processor individually or collectively, further cause the image projection apparatus to:

perform Voronoi tessellation, based on the determined distance between the determined plurality of sensing measurement points; and perform scattered data interpolation on first cells obtained as a result of the Voronoi tessellation to obtain second cells corresponding to the plurality of pixel projection points.

7. The image projection apparatus of claim 6, wherein a shape of the first cells or a shape of the second cells narrows in a direction in which the local gradient is present on the projection plane, based on the curvature characteristic.

8. The image projection apparatus of claim 1, wherein the curvature characteristic of the projection plane comprises information about a directionality of a wave propagating in a single direction on the projection plane.

9. A method for operating an image projection apparatus, the method comprising:

detecting, by at least one sensor of the image projection apparatus, first position data in a coordinate space corresponding to a plurality of sensing measurement points on a projection plane where an optical signal corresponding to an output image is projected;

determining second position data in a coordinate plane reflecting a curvature characteristic of the projection plane, based on the first position data; and obtaining third position data corresponding to a plurality of pixel projection points, wherein the optical signal is projected onto the plurality of pixel projection points of a projection region of the projection plane by performing area-weighted interpolation of the second position data.

10. The method of claim 9, wherein the determining the second position data comprises:

obtaining a local gradient of the plurality of sensing measurement points on a first coordinate plane, based on the first position data; and determining a coordinate axis of a second coordinate plane by reflecting a distribution of the obtained local gradient.

11. The method of claim 10, wherein the determining the coordinate axis of the second coordinate plane comprises:

determining an eigen vector related to a direction and an eigen value related to an inclination based on the distribution of the obtained local gradient; and obtaining the coordinate axis of the second coordinate plane, based on the eigen vector and the eigen value.

12. The method of claim 11, wherein the obtaining the coordinate axis of the second coordinate plane comprises determining a size of the coordinate axis on the second coordinate plane, based on a ratio of the eigen value.

13. The method of claim 10, wherein the obtaining the third position data comprises:

identifying a planar orthogonal coordinate system of the plurality of sensing measurement points on the second coordinate plane, based on the second position data; and determining a distance between the plurality of sensing measurement points on the second coordinate plane using the identified planar orthogonal coordinate system.

14. The method of claim 13, wherein the obtaining the third position data comprises:

performing Voronoi tessellation based on the determined distance between the determined plurality of sensing measurement points; and performing scattered data interpolation on first cells obtained as a result of the Voronoi tessellation to obtain second cells corresponding to the plurality of pixel projection points.

15. The method of claim 14, wherein a shape of the first cells or the second cells narrows in a direction in which the local gradient is present on the projection plane, based on the curvature characteristic.

16. The method of claim 9, wherein the curvature characteristic of the projection plane comprises information about a directionality of a wave propagating in a single direction on the projection plane.

17. A non-transitory storage medium storing at least one computer-readable instruction, wherein when executed by at least a portion of at least one processor in an image projection apparatus, the instructions cause the image projection apparatus to perform:

detecting, by at least one sensor of the image projection sensor, first position data in a coordinate space corresponding to a plurality of sensing measurement points on a projection plane where an optical signal corresponding to an output image is projected;

determining second position data in a coordinate plane reflecting a curvature characteristic of the projection plane, based on the first position data; and obtaining third position data corresponding to a plurality of pixel projection points, wherein the optical signal is projected onto the plurality of pixel projection points of a projection region of the projection plane by performing area-weighted interpolation of the second position data.

18. The non-transitory storage medium of claim 17, wherein the determining the second position data comprises:

obtaining a local gradient of the plurality of sensing measurement points on a first coordinate plane, based on the first position data;

determining an eigen vector related to a direction and an eigen value related to an inclination, based on a distribution of the obtained local gradient; and obtaining a coordinate axis of a second coordinate plane, based on the eigen vector and the eigen value, wherein a size of the coordinate axis is determined by a ratio of the eigen value.

19. The non-transitory storage medium of claim 18, wherein the obtaining the third position data comprises:

identifying a planar orthogonal coordinate system of the plurality of sensing measurement points on the second coordinate plane, based on the second position data;

determining a distance between the plurality of sensing measurement points on the second coordinate plane using the identified planar orthogonal coordinate system;

performing Voronoi tessellation, based on the determined distance between the determined plurality of sensing measurement points; and performing scattered data interpolation on first cells obtained as a result of the Voronoi tessellation to obtain second cells corresponding to the plurality of pixel projection points.

20. The non-transitory storage medium of claim 19, wherein a shape of the first cells or the second cells narrows in a direction in which the local gradient is present on the projection plane, based on the curvature characteristic, and wherein the curvature characteristic of the projection plane comprises information about a directionality of a wave propagating in a single direction on the projection plane.

* * * * *